US011450315B2

(12) United States Patent
Kim et al.

(10) Patent No.: US 11,450,315 B2
(45) Date of Patent: Sep. 20, 2022

(54) ELECTRONIC APPARATUS AND METHOD FOR OPERATING SAME

(71) Applicant: Samsung Electronics Co., Ltd., Suwon-si (KR)

(72) Inventors: Yong Ho Kim, Seoul (KR); Sourabh Pateriya, Bangalore (IN); Sunah Kim, Seongnam-si (KR); Gahyun Joo, Suwon-si (KR); Sang-Woong Hwang, Yongin-si (KR); Say Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 16/478,719

(22) PCT Filed: Dec. 8, 2017

(86) PCT No.: PCT/KR2017/014349
§ 371 (c)(1),
(2) Date: Jul. 17, 2019

(87) PCT Pub. No.: WO2018/135753
PCT Pub. Date: Jul. 26, 2018

(65) Prior Publication Data
US 2020/0051554 A1    Feb. 13, 2020

(30) Foreign Application Priority Data

Jan. 17, 2017    (KR) .................... 10-2017-0007947

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/221* (2013.01); *G10L 2015/223* (2013.01); *G10L 2015/225* (2013.01)

(58) Field of Classification Search
None
See application file for complete search history.

(56) References Cited

U.S. PATENT DOCUMENTS 6,965,863 B1    11/2005  Zuberec et al.
8,521,766 B1 *   8/2013  Hoarty .................. G06F 40/211
                                                          707/769

(Continued)

FOREIGN PATENT DOCUMENTS

EP    2 950 307 A1    12/2015
EP    3 026 667 A1     6/2016

(Continued)

OTHER PUBLICATIONS

Indian Office Action dated Nov. 24, 2020, issued in Indian Application No. 201927032271.

(Continued)

*Primary Examiner* — Jonathan C Kim
(74) *Attorney, Agent, or Firm* — Jefferson IP Law, LLP

(57) ABSTRACT

Various embodiments of the disclosure disclose a method and apparatus for processing a voice recognition service in an electronic device. According to various embodiments of the disclosure, an electronic device may include a microphone, a memory, and a processor operatively coupled to the microphone and the memory. The processor may be configured to wake-up on the basis of detection of a wake-up word, process a first task corresponding to a first voice command of a user on the basis of the wake-up, set a wait time during which a follow-up command can be received on the basis of the processing of the first task, detect a second voice command of the user during the wait time, analyze a (Continued)

conversational context on the basis of the first voice command and second voice command, and process a second task on the basis of a result of the analysis. Various embodiments are possible.

14 Claims, 26 Drawing Sheets

(56) References Cited

U.S. PATENT DOCUMENTS

| | | | |
|---|---|---|---|
| 9,098,467 B1 | 8/2015 | Blanksteen et al. | |
| 9,304,736 B1 | 4/2016 | Whiteley et al. | |
| 9,368,105 B1 | 6/2016 | Freed et al. | |
| 9,940,930 B1* | 4/2018 | Campbell | G10L 15/22 |
| 10,847,149 B1* | 11/2020 | Mok | G10L 15/22 |
| 2003/0065515 A1* | 4/2003 | Yokota | G10L 15/26 704/E15.045 |
| 2009/0252345 A1* | 10/2009 | Le | H04M 1/6058 381/74 |
| 2010/0312547 A1 | 12/2010 | Van Os et al. | |
| 2013/0275164 A1* | 10/2013 | Gruber | G10L 15/22 705/5 |
| 2013/0289994 A1 | 10/2013 | Newman et al. | |
| 2014/0149118 A1* | 5/2014 | Lee | G10L 15/22 704/251 |
| 2014/0195249 A1* | 7/2014 | Chung | G10L 15/22 704/275 |
| 2015/0053779 A1* | 2/2015 | Adamek | F24F 11/30 236/1 C |
| 2015/0340042 A1 | 11/2015 | Sejnoha | |
| 2016/0077574 A1* | 3/2016 | Bansal | G06F 1/3293 704/275 |
| 2016/0358603 A1* | 12/2016 | Azam | G10L 15/22 |
| 2017/0060994 A1* | 3/2017 | Byron | G06F 16/3344 |
| 2017/0169817 A1* | 6/2017 | VanBlon | G10L 15/02 |
| 2017/0352350 A1* | 12/2017 | Booker | G10L 15/22 |
| 2017/0357635 A1* | 12/2017 | Mohaideen P | G06F 16/3338 |
| 2018/0012594 A1* | 1/2018 | Behzadi | G10L 15/183 |
| 2018/0018325 A1* | 1/2018 | Fukuoka | G10L 15/22 |
| 2018/0137859 A1* | 5/2018 | Park | G06F 16/00 |
| 2018/0233137 A1* | 8/2018 | Torok | G06F 3/167 |
| 2019/0057698 A1* | 2/2019 | Raanani | H04M 3/2281 |
| 2019/0130911 A1* | 5/2019 | Hanes | H04W 52/0254 |
| 2020/0051554 A1* | 2/2020 | Kim | G10L 15/18 |

FOREIGN PATENT DOCUMENTS

| | | |
|---|---|---|
| JP | 2004-184803 A | 7/2004 |
| KR | 10-1309042 B1 | 9/2013 |
| KR | 10-2014-0068752 A1 | 6/2014 |
| KR | 10-2014-0089871 A | 7/2014 |
| WO | 2019/022797 A1 | 1/2019 |

OTHER PUBLICATIONS

Extended European Search Report dated Dec. 6, 2019, issued in European Application No. 17892886.7.

* cited by examiner

| Device | Previous Task | In-Context Timeout | Contextual command | Follow-up Task |
|---|---|---|---|---|
| Speaker | Volume | 1 min | Up | Volume up |
| | | | Increase | |
| | | | More | |
| | | | Louder | |
| | | | Down | Volume Down |
| | | | Decrease | |
| | | | Less | |
| | | | Quiet | |
| | | | Mute | |
| | | | ... | ... |
| Mobile | Light | 5 min | Dim up | Light brightness up |
| | | | Brighter | |
| | | | Increase brightness | |
| | | | ... | ... |
| ... | ... | ... | ... | ... |

FIG. 9

| Device | Previous Task | Contextual command |
|---|---|---|
| Music | Volume | Up |
| | | Increase |
| | | More |
| | | Louder |
| | | Down |
| | | Decrease |
| | | Less |
| | | Quiet |
| | | Mute |
| | | ... |
| | Play control | Play |
| | | Pause |
| | | Next |
| | | ... |
| Schedule | Create schedule | Add |
| | | Delete |
| | | Cancel |
| | ... | ... |

ELECTRONIC APPARATUS AND METHOD FOR OPERATING SAME

CROSS-REFERENCE TO RELATED APPLICATION(S)

This application is a U.S. National Stage application under 35 U.S.C. § 371 of an International application number PCT/KR2017/014349, filed on Dec. 8, 2017, which is based on and claimed priority of a Korean patent application number 10-2017-0007947, filed on Jan. 17, 2017, in the Korean Intellectual Property Office, the disclosure of which is incorporated by reference herein in its entirety.

TECHNICAL FIELD

Various embodiments of the disclosure relate to a method and apparatus for processing a voice recognition service in an electronic device.

BACKGROUND ART

Recently, with the development of digital technologies, various types of electronic devices are widely used, such as a mobile communication terminal, a smart phone, a tablet Personal Computer (PC), a notebook, a Personal Digital Assistant (PDA), a wearable device, a digital camera, a personal computer, or the like.

Electronic devices have recently provided various services (or functions) using a voice recognition technique. For example, the voice recognition technique may include a technique which converts an acoustic speech signal acquired by the electronic device through a sound sensor such as a microphone into a word or a sentence. In general, the voice recognition technique may perform a task of removing a noise after extracting a sound signal, and thereafter may perform voice recognition in such a manner that a feature of a voice signal is extracted and then compared with a voice model DataBase (DB).

In recent years, various voice recognition services based on the voice recognition technique have been developed and provided for the electronic device. According to an embodiment, the electronic device provides various amenity services such as mobile search, schedule management, dialing, memo, or music playback based on a user's voice command.

In addition, the voice recognition service is provided based on a pre-set method in order to prevent a malfunction of the voice recognition service in the electronic device. For example, recently, the electronic device can start the voice recognition service on the basis of a voice wake-up method. According to an embodiment, the electronic device uses a specific voice command (e.g., a word) as a wake-up word, and does not perform voice recognition on user's utterance until the wake-up word is input. Regarding the wake-up word, a name or the like of the electronic device (or an agent of the electronic device) may be used as the wake-up word.

Technical Problem

Accordingly, at present, a wake-up word required to perform a voice recognition service cannot be omitted. However, a voice wake-up method is inconvenient in that a user has to utter the wake-up word whenever a task based on the voice recognition service is performed. In addition, the user has to inconveniently utter the wake-up word and repeatedly utter a redundant sentence related to execution of the task after the task is processed even in case of performing a task associated with a previously performed task. Recently, an alternative to the voice wake-up method is used for a wake-up purpose for the voice recognition service, based on a user's intentional input (e.g., an input using a touch or a button or the like). However, there is a problem in that this approach is not appropriate in a hands-free situation or a situation (e.g., far-field situation) in which the user and the electronic device are separated by a far distance.

In various embodiments, a method and apparatus are disclosed for providing a voice recognition service while omitting a wake-up word in an electronic device.

In various embodiments, a method and apparatus are disclosed for performing a voice recognition service based on user's utterance without a wake-up word during a specific time, after performing the voice recognition service depending on wake-up caused by the wake-up word in an electronic device.

In various embodiments, a method and apparatus are disclosed for consecutively performing a voice recognition service associated with a previous task, without a wake-up word and a redundant command, after performing the voice recognition service depending on wake-up caused by the wake-up word in an electronic device.

Solution to Problem

An electronic device according to various embodiments of the disclosure may include a microphone, a memory, and a processor operatively coupled to the microphone and the memory. The processor may be configured to wake-up on the basis of detection of a wake-up word, process a first task corresponding to a first voice command of a user on the basis of the wake-up, set a wait time during which a follow-up command can be received on the basis of the processing of the first task, detect a second voice command of the user during the wait time, analyze the conversational context on the basis of the first voice command and second voice command, and process a second task on the basis of a result of the analysis.

A method of operating an electronic device according to various embodiments of the disclosure may include detecting a wake-up word in an inactive state of a voice recognition service, waking up based on the detection of the wake-up word, processing a first task corresponding to a first voice command of a user on the basis of the wake-up, setting a wait time during which a follow-up command can be received based on the processing of the first task, detecting a second voice command of the user during the wait time, analyzing a conversational context on the basis of the first voice command and second voice command, and processing a second task on the basis of a result of the analysis.

In order to solve the above problems, various embodiments of the disclosure may include a computer-readable recording medium recording a program for executing the method in a processor.

Advantageous Effects of Invention

According to various embodiments, an electronic device and an operating method thereof can allow a user to consecutively perform a voice recognition service while omitting a wake-up word when using the voice recognition service by using the electronic device. According to various embodiments, when the voice recognition service is re-activated within any time after the voice recognition service is performed, the electronic device can process a corresponding task without a wake-up word upon recognizing a command associated with a previous conversational context. Accordingly, after performing the voice recognition service depending on wake-up of the electronic device on the basis of the wake-up word, the user can contiguously perform the voice recognition service based on user's utterance during a specific time without having to repeatedly utter the wake-up word.

In the conventional method, after a wake-up word is uttered every time, the entire sentence related to execution of a task has to be redundantly uttered. However, according to various embodiments, since there is no need to additionally utter the wake-up word and the redundant sentence can be omitted, the user can more conveniently use the voice recognition service.

An electronic device according to various embodiments can contribute to improve usability, easiness, accessibility, and competitive of the electronic device.

BRIEF DESCRIPTION OF DRAWINGS

FIG. 9 illustrates an example of explaining a domain list according to various embodiments of the disclosure;

FIG. 10 is a diagram for explaining a task processing method for each context in an electronic device according to various embodiments of the disclosure;

BEST MODE FOR CARRYING OUT THE INVENTION

Figure 1:
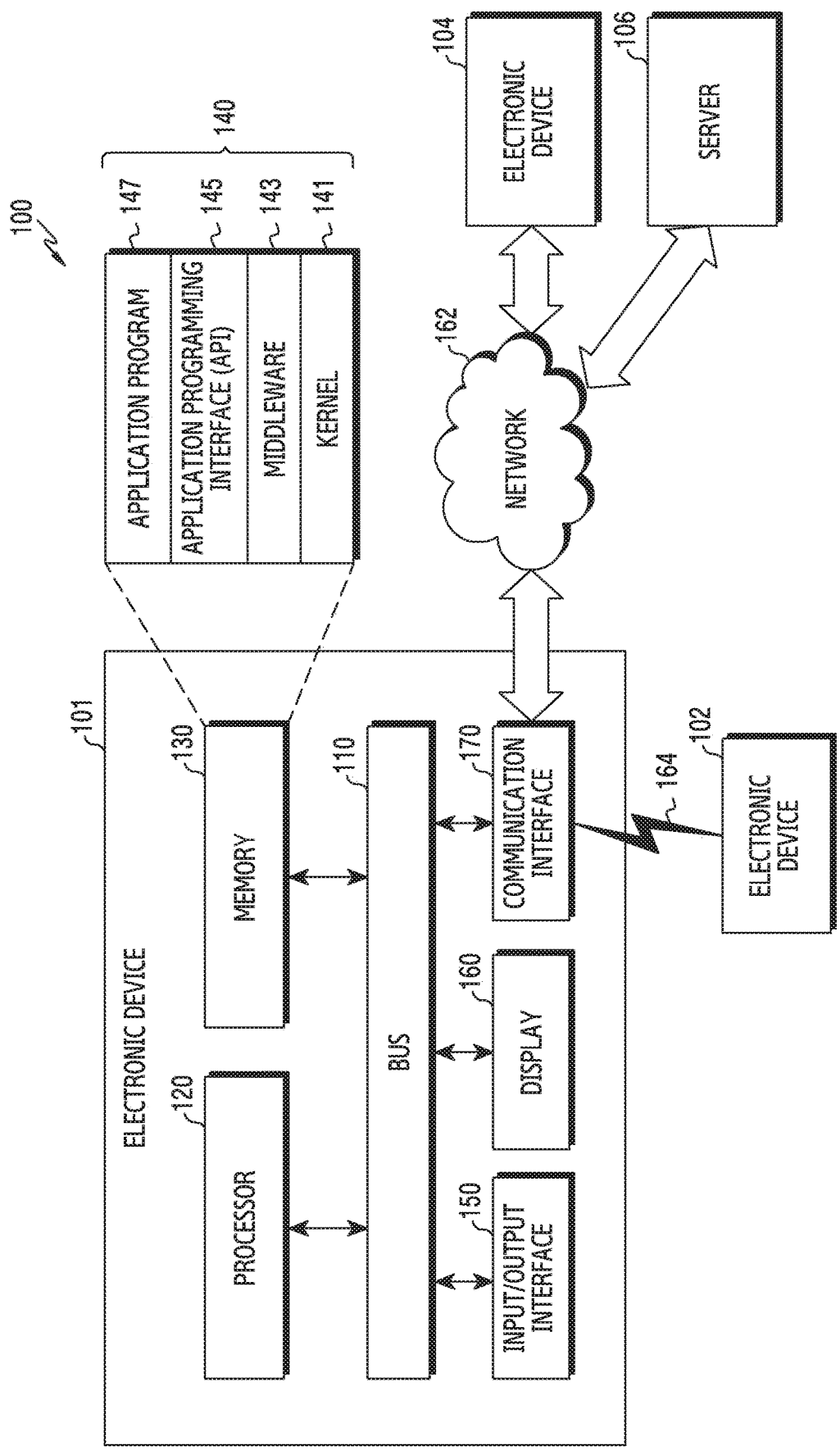
FIG. 1 illustrates a network environment including an electronic device according to various embodiments of the disclosure.

Hereinafter, various embodiments of the disclosure are described with reference to the accompanying drawings. It should be appreciated that the embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression may include a plural expression unless there is a contextually distinctive difference. In the disclosure, expressions such as "A or B", "at least one of A and/or B", "A, B, or C", or "at least one of A, B, and/or C" may include all possible combinations of items enumerated together. Expressions such as "1st" and "2nd" or "first" and "second" may be used to simply distinguish a corresponding component from another, and does not limit the component in other aspect (e.g., importance or order). When a certain (e.g., 1st) component is mentioned as being "operatively or communicatively coupled with/to" or "connected to" a different (e.g., 2nd) component, the certain component is directly coupled with/to another component or can be coupled with/to the different component via another (e.g., 3rd) component.

An expression "configured to" used in the disclosure may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an Application Processor (AP)) capable of performing corresponding operations by executing one or more software programs stored in a memory device.

An electronic device according to various embodiments of the disclosure may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit). According to some embodiments, the electronic device may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

In another embodiment, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Positioning System (GPS) receiver, an Event Data Recorder (EDR), a Flight Data Recorder (FDR), an automotive infotainment device, an electronic equipment for ship (e.g., a vessel navigation device, a gyro compass, etc.), avionics, a security device, a car head unit, an industrial or domestic robot, a drone, an Automatic Teller's Machine (ATM) of financial institutions, Point Of Sales (POS) of shops, and internet of things (e.g., a light bulb, various sensors, an electric or gas meter, a sprinkler device, a fire alarm, a thermostat, a streetlamp, a toaster, a fitness equipment, a hot water tank, a heater, a boiler, etc.). According to some embodiments, the electronic device may include at least one of part of furniture, buildings/constructions or cars, an electronic board, an electronic signature receiving device, a projector, and various measurement machines (e.g., water supply, electricity, gas, propagation measurement machine, etc.). The electronic device according to various embodiments may be flexible, or may be a combination of two or more of the aforementioned various devices. The electronic device according to an embodiment of the disclosure is not limited to the aforementioned devices. The term 'user' used in the disclosure may refer to a person who uses the electronic device or a device (e.g., an Artificial Intelligence (AI) electronic device) which uses the electronic device.

FIG. 1 illustrates a network environment including an electronic device according to various embodiments.

Referring to FIG. 1, an electronic device 101 in a network environment 100 is disclosed according to various embodiments. The electronic device 101 may include a bus 110, a processor 120, a memory 130, an input/output interface 150, a display 160, and a communication interface 170. In some embodiments, the electronic device 101 may omit at least one of the aforementioned components or may additionally include other components.

The bus 110 may include a circuit for coupling the aforementioned components 120 to 170 to each other and for delivering communication (e.g., a control message and/or data) between the aforementioned components.

The processor 120 may include one or more of a Central Processing Unit (CPU), an Application Processor (AP), and a Communication Processor (CP). The processor 120 may control, for example, at least one of other components of the electronic device 101 and/or may execute an arithmetic operation or data processing for communication. An operation of processing (or controlling) the processor 120 according to various embodiments will be described in detail with reference to the accompanying drawings.

The memory 130 can be a volatile and/or nonvolatile memory. The memory 130 stores commands or data, such as the reception control list relating to at least another component of the electronic device 101. The memory 130 may store software and/or a program 140. The program 140 includes kernel 141, middleware 143, application programming interface (API) 145, and/or application programs (or applications) 147. At least some of the kernel 141, the middleware 143, and the API 145 may be referred to as an operating system (OS).

The kernel 141 controls or manages system resources, such as the bus 110, the processor 120, or the memory 130 used for performing an operation or function implemented by the other programs, such as the middleware 143, the API 145, or the applications 147. Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data. In addition, the middleware 143 processes one or more task requests received from the applications 147 according to priorities thereof. For example, the middleware 143 assigns priorities for using the system resources of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function, such as an instruction for file control, window control, image processing, or text control.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may be a liquid crystal display (LCD), a light emitting diode (LED) display, an organic LED (OLED) display, a micro electro mechanical system (MEMS) display, an electronic paper display, etc. The display 160 displays various types of content, such as text, images, videos, icons, or symbols for the user. The display 160 may include a touch screen and receive, for example, touch, gesture, proximity, hovering inputs, etc., using an electronic pen or the user's body part.

The communication interface 170 can establish a communication between the electronic device 101 and an external electronic device, such as a first external electronic device 102, a second external electronic device 104, or a server 106. For example, the communication interface 170 can communicate with the external electronic device, such as the first external electronic device 102, the second external electronic device 104, or the server 106, in connection to the network 162 through wireless communication or wired communication.

The wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS.

The wired communication, for example, can include at least one of Universal Serial Bus (USB), High Definition Multimedia Interface (HDMI), Recommended Standard 232 (RS-232), power line communications, and Plain Old Telephone Service (POTS).

The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

The server 106 may include, for example, at least one of a voice recognition server, a service for providing a voice recognition service, a data server, a search server, a payment server, a card company server, a bank server, an authentication server, an application server, a management server, an integration server, a provider server (or a communication provider server), a content server, an internet server, a cloud server, and the like.

Figure 2:
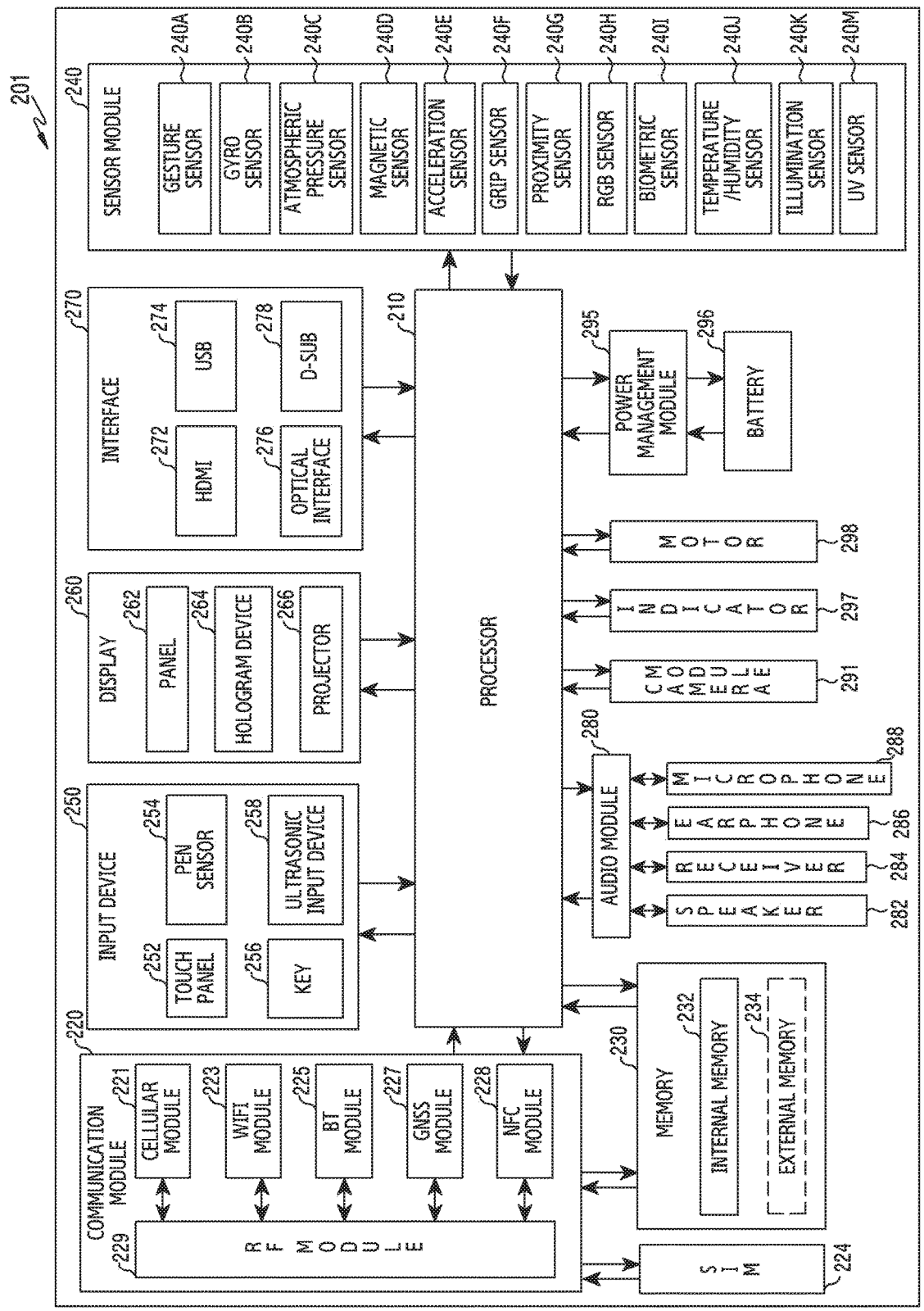
FIG. 2 is a block diagram of an electronic device according to various embodiments of the disclosure.

FIG. 2 is a block diagram of an electronic device 201 according to an embodiment of the present disclosure.

The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. In various embodiments, the electronic device 201 is not necessarily constructed of components of FIG. 2, and thus the number of components thereof may be greater than or less than the number of components of FIG. 2. For example, the electronic device 201 according to various embodiments may not include some components according to a type thereof. According to various embodiments, components of the electronic device 201 may be mounted to a housing (e.g., a bezel, a body) of the electronic device 201, or may be constructed outside thereof.

The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The communication module 220 may further include, for example, a WiGig module (not shown). According to one embodiment, the WiFi module 223 and the WiGig module may be integrated into one chip.

The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package.

The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module.

The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), MultiMedia Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user.

The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves. According to various embodiments, the input device 250 may include an electronic pen. According to various embodiments, the input device 250 may be implemented to receive a force touch.

The display 260 (e.g., the display 160) can include at least one of a panel 262, a hologram device 264, a projector 266, and/or a control circuit for controlling them.

The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252.

The hologram device 264 can show three-dimensional images in the air by using the interference of light. The projector 266 can display an image by projecting light on a screen. The screen, for example, can be placed inside or outside the electronic device 201.

The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288.

The camera module 291, as a device for capturing still images and videos, can include one or more image sensors (e.g., a front sensor or a rear sensor), a lens, an Image Signal Processor (ISP), or a flash (e.g., an LED or a xenon lamp).

The power management module 295, for example, can manage the power of the electronic device 201. According to an embodiment of the present disclosure, the power management module 295 can include a Power Management IC (PMIC), a charger IC, or a battery or fuel gauge, for example.

The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™.

Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
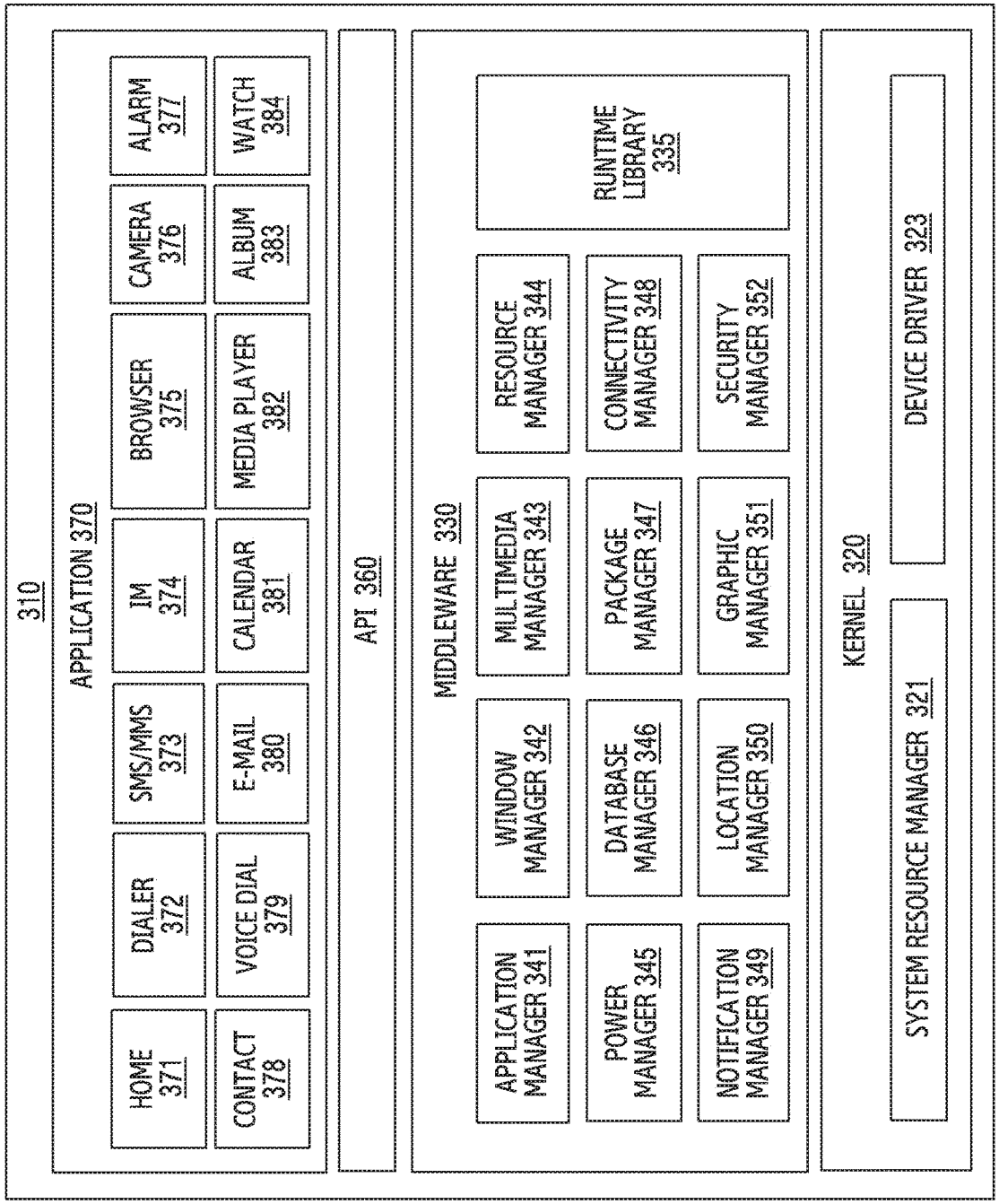
FIG. 3 is a block diagram of a program module according to various embodiments of the disclosure.

FIG. 3 is a block diagram of a program module according to an embodiment of the present disclosure.

A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™.

Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device.

The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing.

The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space.

The power manager 345 can manage the capacity or power of the battery and provide power information for an operation of the electronic device. The power manager 345 can operate together with a Basic Input/Output System (BIOS).

The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication.

The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components.

The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application.

The application 370 can include an information exchange application for supporting information exchange between the electronic device and an external electronic device. The information exchange application can include, for example, a notification relay application for relaying specific information to the external device or a device management application for managing the external electronic device.

The notification relay application can relay notification information from another application of the electronic device to an external electronic device, or receive and forward notification information from an external electronic device to the user.

The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device.

The application 370 can include a specified application (e.g., a health care application of a mobile medical device) according to a property of the external electronic device.

The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

A term "module" used in the disclosure includes a unit consisting of hardware, software, or firmware, and may be interchangeably used with a term such as a unit, a logic, a logical block, a component, a circuit, and the like. The "module" may be an integrally constructed component or a minimum unit or one part thereof for performing one or more functions. The "module" may be mechanically or electrically implemented, and may include, for example, an Application-Specific Integrated Circuit (ASIC) chip, a Field-Programmable Gate Arrays (FPGAs), or a programmable-logic device, which is known or to be developed to perform certain operations.

At least part of an apparatus (e.g., modules or functions thereof) or method (e.g., operations) according to various embodiments may be implemented with an instruction stored in a computer-readable storage medium (e.g., the memory 130). If the instruction is executed by a processor (e.g., the processor 120 of FIG. 1 or the processor 210 of FIG. 2), the processor may perform a function corresponding to the instruction.

The computer-readable recording medium may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. According to various embodiments, a recording medium may include a computer readable recording medium recording a program for allowing the processors 120 and 210 to perform various methods described below.

The module or programming module according to various embodiments may further include at least one or more components among the aforementioned components, or may omit some of them, or may further include other components. According to various embodiments, operations performed by the module, programming module, or other components may be executed in a sequential, parallel, repetitive, or heuristic manner. At least some of the operations may be executed in a different order or may be omitted, or other operations may be added.

Various embodiments of the disclosure disclose a method and apparatus for processing a voice recognition service in an electronic device. According to various embodiments, a voice recognition service can be provided by an electronic device while omitting a wake-up word capable of allowing the electronic device to recognize a start of the voice recognition service. For example, the voice recognition service can be performed based on user's utterance without the wake-up word during a specific time after the voice recognition service is performed according to wake-up caused by the wake-up word. According to various embodiments, upon recognizing utterance of a command associated with a previous conversation within a specific time, the electronic device can process a task corresponding to the command without the wake-up word.

An electronic device according to various embodiments may include all devices using one or more of various processors such as an Application Processor (AP), a Communication Processor (CP), a Graphic Processing Unit (GPU), a Central Processing Unit (CPU), and the like. For example, the electronic device according to various embodiments may include an information communication devices, a multimedia device, a wearable device, an Internet of Things (IoT) device, or various other devices corresponding to these devices.

Hereinafter, an operating method and apparatus will be described according to various embodiments of the disclosure with reference to the accompanying drawings. However, since the various embodiments of the disclosure are not restricted or limited by the content described below, it should be noted that the disclosure is applicable to the various embodiments on the basis of embodiments described below. A hardware-based access method is described for example in the various embodiments of the disclosure described hereinafter. However, since the various embodiments of the disclosure include a technique in which hardware and software are both used, a software-based access method is not excluded in various embodiments of the disclosure.

Figure 4:
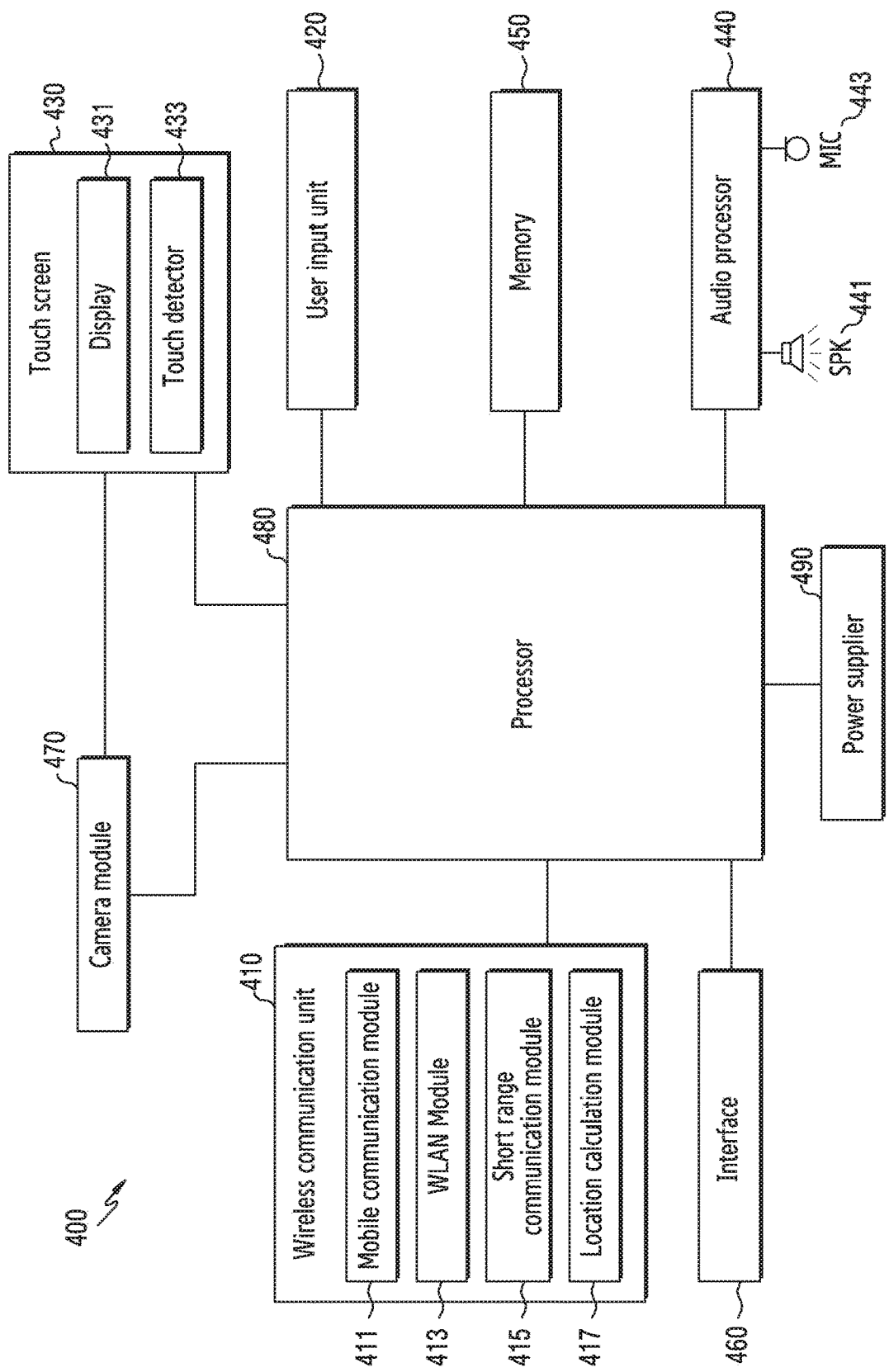
FIG. 4 briefly illustrates a structure of an electronic device according to various embodiments of the disclosure.

FIG. 4 briefly illustrates a structure of an electronic device according to various embodiments of the disclosure.

Referring to FIG. 4, an electronic device 400 according to various embodiments may include, for example, a wireless communication unit 410, a user input unit 420, a touch screen 430, an audio processor 440, a memory 450, an interface 460, a camera module 470, a processor 480 (e.g., the processor 120 of FIG. 1, the processor 210 of FIG. 2), and a power supplier 490. In various embodiments, the electronic device 400 is not necessarily constructed of components of FIG. 4, and thus the number of components thereof may be greater than or less than the number of components of FIG. 4.

The wireless communication unit 410 may be constructed identically or similarly, for example, to the communication module 220 of FIG. 2. The wireless communication unit 410 may include one or more modules for enabling wireless communication between the electronic device 400 and a different external electronic device (e.g., the electronic device 102 or 104, the server 106). For example, the wireless communication unit 410 may include a mobile communication module 411, a Wireless Local Area Network (WLAN) module 413, a short-range communication module 415, a location calculation module 417, or the like. In various embodiments, the wireless communication unit 410 may include a module for performing communication with a neighboring external electronic device (e.g., a short-range communication module, a long-range communication module, or the like).

The mobile communication module 411 may be constructed identically or similarly, for example, to the cellular module 221 of FIG. 2. The mobile communication module 411 may transmit/receive a radio signal with respect to at least one of a base station, an external electronic device (e.g., the different electronic device 104), and various servers on a mobile communication network. The radio signal may include a voice signal, a data signal, or various types of control signals. The mobile communication module 411 may transmit a variety of data required for an operation of the electronic device 400 to an external device (e.g., the server 106 or the different electronic device 104 or the like) in response to a user request.

The WLAN module 413 may be constructed identically or similarly, for example, to the WiFi module 223 of FIG. 2. The WLAN module 413 may indicate a module for establishing a WLAN link with respect to a wireless Internet access and an external device (e.g., the different electronic device 102 or the server 106 or the like). The WLAN module 413 may be placed inside or outside the electronic device 400. A wireless Internet technique may use Wireless Fidelity (WiFi), Wireless broadband (Wibro), World interoperability for Microwave access (WiMax), High Speed Downlink Packet Access (HSDPA), millimeter Wave (mmWave), or the like. The WLAN module 413 may be directly coupled to the electronic device 400 or interwork with the external device (e.g., the different electronic, etc.) coupled through a network (e.g., the wireless Internet network) (e.g., the network 162 of FIG. 1), to transmit a variety of data of the electronic device 400 to the outside or receive the data from the outside. The WLAN module 413 may maintain an always-on state, or may be turned on/turned off according to a configuration of the electronic device 400 or a user input.

The short-range communication module 415 may indicate one or more modules (e.g., the Bluetooth module 225, the NFC module 228, etc.) for performing short-range communication. A short-range communication technique may use, for example, Bluetooth, Bluetooth Low Energy (BLE), Radio Frequency IDentification (RFID), Infrared Data Association (IrDA), Ultra Wideband (UWB), ZigBee, Near Field Communication (NFC), or the like. The short-range communication module 415 may transmit a variety of data of the electronic device 400 to the outside or receive the data from the outside by interworking with the external device (e.g., the different electronic device 102, etc.) coupled to the electronic device 400 through a network (e.g., a short-range communication network). The short-range communication module 415 may maintain an always-on state, or may be turned on/turned off according to a configuration of the electronic device 400 or a user input.

The location calculation module 417 may be constructed identically or similarly, for example, to the GNSS module 227 of FIG. 2. The location calculation module 417 is a module for acquiring a location of the electronic device 400, and a representative example thereof may include a Global Position System (GPS) module. The location calculation module 417 may measure the location of the electronic device 400 according to a triangulation principle.

The user input unit 420 may generate input data for controlling the operation of the electronic device 400 in response to a user input. The user input unit 420 may include at least one input means for detecting various user inputs. For example, the user input unit 420 may include a key pad, a dome switch, a physical button, a touch pad (static pressure/electrostatic), jog & shuttle, a sensor (e.g., the sensor module 240 of FIG. 2), or the like.

The user input unit 420 may be partially implemented outside the electronic device 400 in a button form, and may be partially or entirely implemented with a touch panel. The user input unit 420 may receive a user input for initiating various operations (e.g., a voice recognition service (or a voice recognition function), an application execution function, a capture function, a data creation function, a data reproduction function, etc.) of the electronic device 400, and may produce an input signal based on the user input.

The touch screen 430 may indicate an input/output device capable of simultaneously performing an input function and a display function. According to various embodiments, the touch screen 430 may include a display 431 (e.g., the display 160 of FIG. 1 or the display 260 of FIG. 2) and a touch detector 433. The touch screen 430 may provide an input/output interface between the electronic device 400 and the user. For example, the touch screen 430 may deliver a touch input of the user to the electronic device 400, or may play a mediation role for showing an output from the electronic device 400 to the user. The touch screen 430 may show a visual output to the user. The visual output may be shown in a form of a text, a graphic, a video, and a combination of them.

The display 431 may display (output) a variety of information processed in the electronic device 400. For example, the display 431 may display various User Interfaces (UIs) or Graphic UI (GUIs) related to using of the electronic device 400. According to various embodiments, the display 431 431 may provide various screen configurations to provide the user with a feedback indicating whether it is in an active (or timeout) state during a voice recognition service. Various displays (e.g., the display 160 of FIG. 1) may be used as the display 431. In various embodiments, a bended display may be used as the display 431.

The touch detector 433 may be mounted on the display 431, and may detect a user input which is in contact with or approaches to a surface of the touch screen 430. The user input may include a touch event or a proximity event which is input based on at least one of a single-touch, a multi-touch, a hovering, and an air gesture. In various embodiments, the touch detector 433 may receive a user input for initiating an operation related to a usage of the electronic device 400, and may generate an input signal depending on the user input. The touch detector 433 may be configured to convert a change in a pressure applied to a specific portion of the display 431 or a capacitance or the like which is generated at a specific portion of the display 431 into an electrical input signal. The touch detector 433 may detect a location and area in which an input tool (e.g., a user's finger, an electronic pen, etc.) is in touch with or approaches to the surface of the display 431. Further, the touch detector 433 may be implemented to be able to detect up to a pressure (e.g., a force touch) when a touch is made according to an applied touch mechanism.

The audio processor 440 may be constructed identically or similarly, for example, to the audio module 280 of FIG. 2. The audio processor 440 may perform a function of transmitting an audio signal input from the processor 480 to a speaker (SPK) 441 and delivering an audio signal such as a voice or the like input from a microphone (MIC) 443 to the processor 480. The audio processor 440 may output voice/sound data by translating it into an audible sound through the SPK 441 under the control of the processor 480, and may deliver an audio signal such as a voice or the like received from the MIC 443 by translating it into a digital signal.

The SPK 441 may output audio data received from the wireless communication unit 410 or stored in the memory 450. The SPK 441 may output a sound signal related to various operations (functions) performed in the electronic device 400.

The MIC 443 may receive an external sound signal, and may process it as electrical voice data. Various noise reduction algorithms may be implemented in the MIC 443 to remove a noise generated in a process of receiving the external sound signal. The MIC 443 may manage an input of audio streaming such as a voice command (e.g., a voice command for controlling activation/deactivation of a voice recognition service or the like).

The memory 450 (e.g., the memory 130 of FIG. 1 or the memory 230 of FIG. 2) may store one or more programs executed by the processor 480, and may perform a function for temporarily storing data to be input/output. The data to be input/output may include, for example, a file such as a video, an image, a photo, an audio, or the like. The memory 450 may play a role of storing acquired data in such a manner that data acquired on a real-time basis is stored in a temporary storage device (e.g., a buffer) and data confirmed to be stored is stored in a long-term storage device.

The memory 450 may store one or more programs and data related to execution of a function or the like for providing the voice recognition service depending on wake-up caused by a wake-up word. According to various embodiments, the memory 450 may store one or more programs, data, or instructions related to allowing the processor 480 to detect the wake-up word in an inactive state of the voice recognition service, wake up on the basis of the detection of the wake-up word, and process a first task corresponding to a first voice command of a user on the basis of the wake-up. According to various embodiments, the memory 450 may store one or more programs, data, or instructions related to allowing the processor 480 to set a wait time during which a follow-up command can be received based on the processing of the first task, detect a second voice command of the user during the wait time, analyze a conversational context on the basis of the first voice command and second voice command, and process a second task on the basis of a result of the analysis.

According to various embodiments, the memory 450 may store one or more programs, data, or instructions related to allowing the processor 480 to transition from the inactive state of the voice recognition service to an active state, maintain the active state of the voice recognition service during the wait time, and extend the wait time in response to voice command reception during the wait time.

The memory 450 may include an extended memory (e.g., the external memory 234 of FIG. 2) or an internal memory (e.g., the internal memory 232 of FIG. 2). The electronic device 400 may operate in association with a web storage which performs a storage function of the memory 450 on the Internet.

The memory 450 may include one or more application modules (or software modules). For example, a software component may include an operating system software module, a communication software module, a graphic software module, a user interface software module, a Moving Picture Experts Group (MPEG) module, a camera software module, one or more application software modules, or the like. In addition, a module as a software component can be expressed as a set of instructions, and thus may be expressed as an instruction set. The module may also be referred to as a 'program'. In various embodiments, the memory 450 may include additional modules (instructions) in addition to the aforementioned module. Optionally, some modules (instructions) may not be used.

The operating system software module may include several software components for controlling a general system operation. The control of the general system operation may imply, for example, memory management and control, storage hardware (device) control and management, power control and management, or the like. In addition, the operating system software module may perform a function for facilitating communication between several hardware components (devices) and software components (programs).

The communication software module may enable communication with other electronic devices such as a wearable device, a smart phone, a computer, a server, a television, a monitor, an Internet of Things (IoT) device, a mobile terminal, or the like via a communication module (e.g., the wireless communication unit 410, the communication module 220) or an interface (e.g., the interface 460, the interface 270). In addition, the communication software module may consist of a protocol structure associated with a corresponding communication scheme.

The graphic software module may include several software components for providing and displaying graphics on a display (e.g., the display 431, the display 260). In various embodiments, the term "graphic" may be used for the meaning including a text, a web page, an icon, a digital image, a video, an animation, or the like.

The user interface software module may include several software components related to a User Interface (UI). For example, the user interface software module may include content related to how a state of the user interface changes and in which condition the state of the user interface changes.

The MPEG module may include software components which enable digital content (e.g., video, audio)-related processes and functions (e.g., content creating, reproduction, distribution, transmission, etc.).

The camera software module may include a camera-related software component which enables camera-related processes and functions.

The application module may include a web browser including a rendering engine, an e-mail, an instant message, word processing, keyboard emulation, an address book, a touch list, a widget, a Digital Right Management (DRM), iris scan, context cognition (or context awareness), voice recognition, a position determining function, a location-based service, etc.

The memory 450 may include a computer readable recording medium recording a program for executing methods according to various embodiments in the processor 480.

According to various embodiments, a computer readable recording medium may include a computer readable recording medium recording a program for performing setting a wait time during which a follow-up command can be received based on the task processing, detecting a voice command of the user during the wait time, analyzing a conversational context on the basis of a context based on a previous voice command (e.g., the first voice command) and a context based on the detected voice command (e.g., the second voice command), and processing a related task on the basis of a result of the analysis.

The interface 460 may be constructed identically or similarly, for example, to the interface 270 of FIG. 2. The interface 460 may receive data transmitted from the different electronic device, or may deliver supplied power to each component inside the electronic device 400. The interface 460 may allow data inside the electronic device 400 to be transmitted to the different electronic device. For example, a wired/wireless headphone port, an external charger port, a wired/wireless data port, a memory card port, an audio input/output port, a video input/output port, an earphone port, or the like may be included in the interface 460.

The camera module 470 (e.g., the camera module 291 of FIG. 2) is configured to support a capturing function of the electronic device 400. The camera module 470 may capture any subject under the control of the processor 480, and may deliver captured data (e.g., an image) to the display 431 and the processor 480.

According to various embodiments, the camera module 470 may include, for example, a first camera (e.g., a color (RGB) camera) for acquiring color information and a second camera (e.g., an InfraRed (IR) camera) for acquiring depth information (e.g., location information and distance information of the subject). The camera module 470 may include an image sensor. The image sensor may be implemented with a Charged Coupled Device (CCD) or a Complementary Metal-Oxide Semiconductor (CMOS). According to one embodiment, the first camera may be a front camera provided in a front surface of the electronic device 400. According to various embodiments, the front camera may be replaced with the second camera, and may not be provided in the front surface of the electronic device 400. According to various embodiments, the first camera may be disposed to the front surface of the electronic device 400 together with the second camera. According to one embodiment, the first camera may be a rear camera provided in a rear surface of the electronic device 400. According to one embodiment, the first camera may include both of the front camera and the rear camera which are provided respectively to the front surface and the rear surface of the electronic device 400.

The processor 480 (e.g., the control circuit) may provide an overall control to the electronic device 400. In various embodiments, the processor 480 may be constructed identically or similarly, for example, to the processor 120 of FIG. 1 or the processor 210 of FIG. 2.

According to various embodiments, the processor 480 may process operations of detecting a wake-up word in an inactive state of a voice recognition service, waking up based on the detection of the wake-up word, and performing a first task corresponding to a first voice command of a user on the basis of the wake-up. According to various embodiments, the processor 480 process operations of setting a wait time during which a follow-up command can be received based on the processing of the first task, detecting a second voice command of the user during the wait time, analyzing a conversational context on the basis of the first voice command and second voice command, and performing a second task on the basis of a result of the analysis.

According to various embodiments, the processor 480 may process an operation of transitioning from the inactive state of the voice recognition service to an active state. The processor 480 may process an operation of maintaining the active state of the voice recognition service during the wait time, and extending the wait time in response to voice command reception during the wait time. According to various embodiments, the processor 480 may process operations of determining a timeout of the wait time and transitioning from the active state of the voice recognition service to the inactive state upon occurrence of a timeout.

The processor 480 may include one or more processors for controlling the operation of the electronic device 400.

For example, the processor 480 may include a Communication Processor (CP), an Application Processor (AP), an interface (e.g., a General Purpose Input/Output (GPIO)), an internal memory, and the like as separate components, or these components may be integrated in one or more Integrated Circuits (ICs). According to an embodiment, the AP may perform several functions for the electronic device 400 by executing various software programs, and the CP may process and control voice communication and data communication. The processor 480 may execute a software module (e.g., an instruction set) stored in the memory 450 and thus perform various specific functions corresponding to the module.

In various embodiments, the processor 480 may control an operation of a hardware module such as the audio processor 440, the interface 460, the display 431, the camera module 470, or the like. An operation of controlling (or processing) the processor 480 will be described in detail with reference to drawings described below according to various embodiments of the disclosure.

According to various embodiments, the processor 480 may be implemented with one or more processors for controlling the operation of the electronic device 400 according to various embodiments of the disclosure by executing one or more programs stored in the memory 450. According to various embodiments, the processor 480 may be electrically or operatively coupled to the display 431, MIC 443, and memory 450 of the electronic device 400.

The power supplier 490 may supply power required for an operation of each component by receiving external power and internal power under the control of the processor 480. In various embodiments, the power supplier 490 may supply or turn on/off power to the wireless communication unit 410, the display 431, the camera module 470, or the like under the control of the processor 480. According to various embodiments, the power supplier 490 may include, for example, a battery control circuit. For example, the power supplier 490 may include a battery (e.g., a rechargeable battery and/or a solar battery), a battery remaining amount measurement circuit (e.g., a fuel gauge), a Power Management Integrated Circuit (PMIC), a charging circuit, a voltage raising circuit (e.g., a booster circuit), or the like.

Figure 5A:
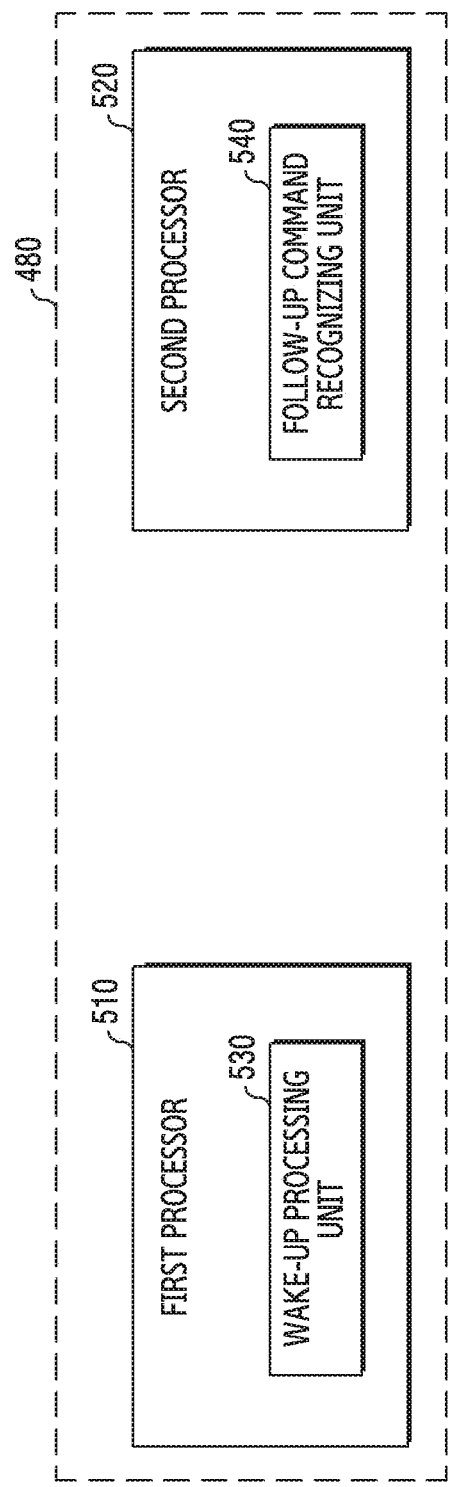
FIG. 5A, FIG. 5B and FIG. 5C illustrate an example of implementing a component for a voice recognition service in an electronic device according to various embodiments of the disclosure.
Figure 5B:
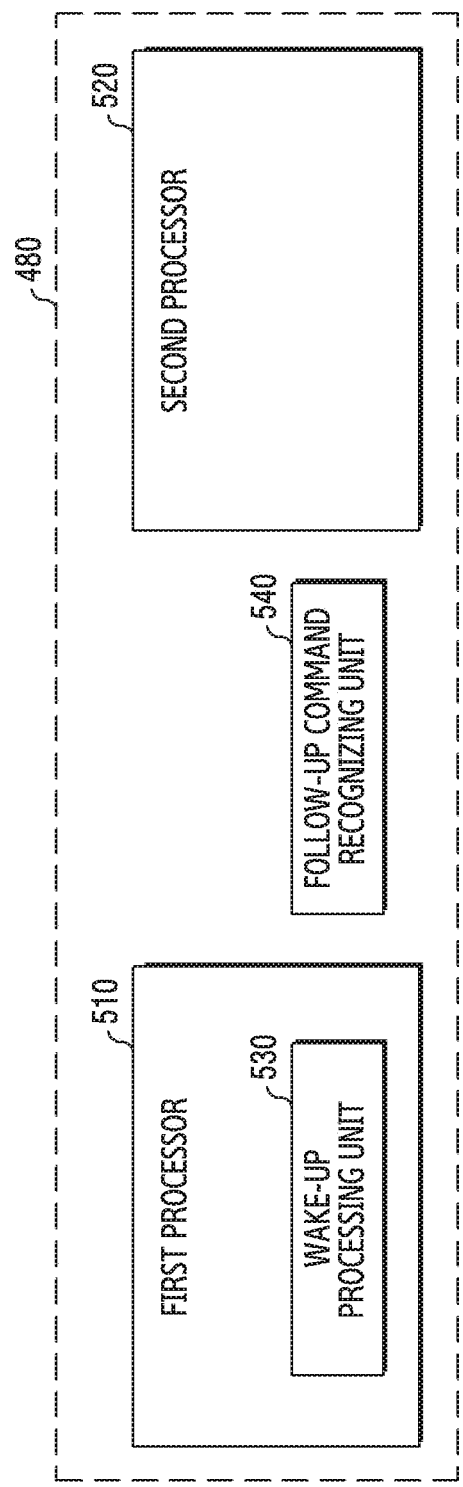
Figure 5C:
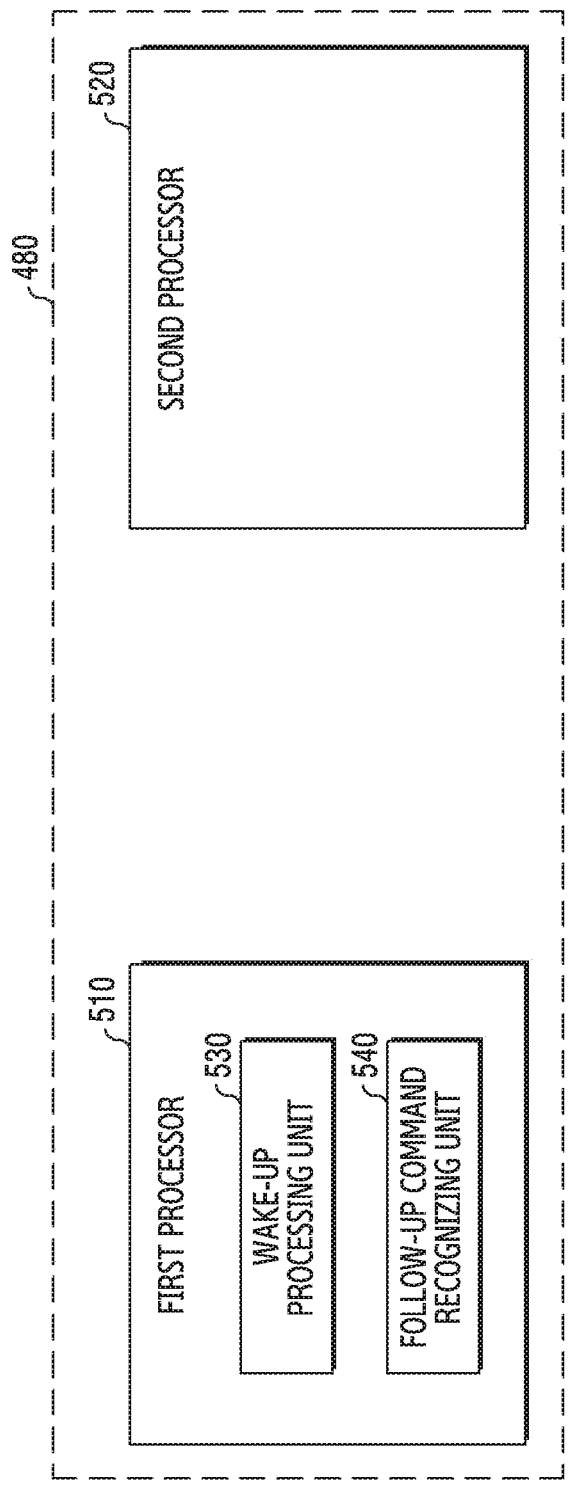

FIG. 5A, FIG. 5B, and FIG. 5C illustrate an example of implementing a component for a voice recognition service in an electronic device according to various embodiments of the disclosure.

Referring to FIG. 5A, FIG. 5B, and FIG. 5C, FIG. 5A, FIG. 5B, and FIG. 5C may show an example of implementing a processor for processing an operation related to a voice recognition service in the electronic device 400 according to various embodiments. For example, in various embodiments, the processor 480 may include a first processor 510 related to recognition of a wake-up word and a second processor 520 related to recognition of a voice after wake-up (e.g., a follow-up command) and processing of an overall operation related to the voice recognition service.

As shown in FIG. 5A, according to various embodiments, the first processor 510 may include a module for recognizing a wake-up word for initiating the voice recognition service when the electronic device 400 is in a sleep state or an operating state. According to an embodiment, the first processor 510 may include a wake-up processing unit 530 (e.g., a wake-up engine).

According to various embodiments, the second processor 520 may wake up in response to detection of the wake-up for initiating the voice recognition service of the first processor 510. The second processor 520 may include a module for performing voice recognition after the wake-up is achieved by means of the first processor 510. According to an embodiment, the second processor 520 may include a follow-up command recognizing unit 540 (e.g., a voice recognition engine, an Automatic Speech Recognition (ASR) engine).

According to various embodiments, the first processor 510 may be configured in an active state to be able to recognize the wake-up word, and the second processor 520 may wake up by means of the first processor 510, on the basis of the wake-up word detection of the first processor 510.

As shown in FIG. 5B, according to various embodiments, the first processor 510 may recognize the wake-up word on the basis of the wake-up processing unit 530. The second processor 520 may process an operation related to the voice recognition service, and the electronic device 400 may additionally include a chip (e.g., the follow-up command recognizing unit 540) to recognize a follow-up command.

According to various embodiments, the follow-up command recognizing unit 540 may operate to recognize the follow-up command by waking up on the basis of the wake-up word recognition of the first processor 510 (e.g., the wake-up processing unit 530). The second processor 520 may wake up by means of the first processor 510 or the follow-up command recognizing unit 540 to process an operation related to the voice recognition service. According to an embodiment, the second processor 520 may wake up in sequence or in parallel with the wake-up of the follow-up command recognizing unit 540. The second processor 520 may have the same or similar structure as the processor 210 of FIG. 2 or the processor 480 of FIG. 4. According to an embodiment, the second processor 520 may be implemented with an Application Processor (AP).

For example, the processor 480 may be implemented with the first processor 510 (e.g., the wake-up processing unit 530) for recognizing the wake-up word, a third processor (e.g., the follow-up command recognizing unit 540) for recognizing the follow-up command, and the second processor 520 for providing an overall process of the voice recognition service based on the follow-up command. According to an embodiment, the first processor 510 and the follow-up command recognizing unit 540 may be implemented with an additional chip (e.g., an wake-up engine, an ASR engine) capable of processing an operation related to voice recognition (e.g., a wake-up word, a follow-up command), and the second processor 520 may process an operation related to execution of the voice recognition service on the basis of the voice recognition.

Although not shown, according to various embodiments, the second processor 520 may include various processing modules (not shown) related to providing of the voice recognition service provided by the electronic device 400 while omitting the wake-up word capable of recognizing a start of the voice recognition service. According to an embodiment, the second processor 520 may include a timeout processing unit (not shown) for managing an active (or timeout) state during a voice service, a feedback processing unit (not shown) for outputting a feedback which is set to a user during the voice service, a context analyzing unit (not shown) for determining whether it is an associated task by comparing contexts on the basis of voice information which is input during the voice recognition service, a task processing unit (not shown) for processing a related task on the basis of a result of context analysis, or the like.

As shown in FIG. 5C, according to various embodiments, functions of the first processor 510 for recognizing the wake-up word and the second processor 520 for recognizing the follow-up command may be implemented by one processor. For example, the first processor 510 may include the wake-up processing unit 530 and the follow-up command recognizing unit 540. The second processor 520 may operate to process the voice recognition service after the wake-up is achieved by means of the first processor 510.

Although not shown, according to various embodiments, it can be implemented to recognize the wake-up word and the follow-up command by using one voice recognition engine (e.g., the first processor 510 or the wake-up processing unit 530), instead of additionally implementing (or adding) the follow-up command recognizing unit 540 for recognizing the follow-up command.

According to various embodiments, the aforementioned various implementations of the first processor 510 for recognizing the wake-up word for initiating the voice recognition service and the second processor 520 for recognizing the follow-up command after the wake-up caused by the wake-up word recognition of the first processor 510 may be divided or integrated according to a device type (or feature) of the electronic device 400. For example, according to a device type based on power consumption, the first processor 510 and the second processor 520 may be implemented independently or may be implemented in a form of one chip.

According to an embodiment, if the electronic device 400 is a device to which power is always connected such as a refrigerator, an air conditioner, a television, or the like, it can be implemented by one embedded processor (e.g., ASR) without having to add a separate chip (e.g., the second processor 520) for processing the follow-up command.

According to an embodiment, if the electronic device 400 is a device which uses a high-capacity battery such as an automotive infotainment device, it can be implemented by a single processor (e.g., ASR) without having to add a separate chip for processing the follow-up command.

According to an embodiment, if the electronic device 400 is a device which uses a low-power battery such as a smart phone, a watch, a Bluetooth speaker, or the like, a low-power chip (e.g., the second processor 520) capable of recognizing a command may be added in addition to the first processor 510. Alternatively, according to various embodiments, the electronic device 400 may be designed such that both the wake-up word and the command can be recognized while using one low-power chip (e.g., the first processor 510 or the second processor 520).

Figure 6:
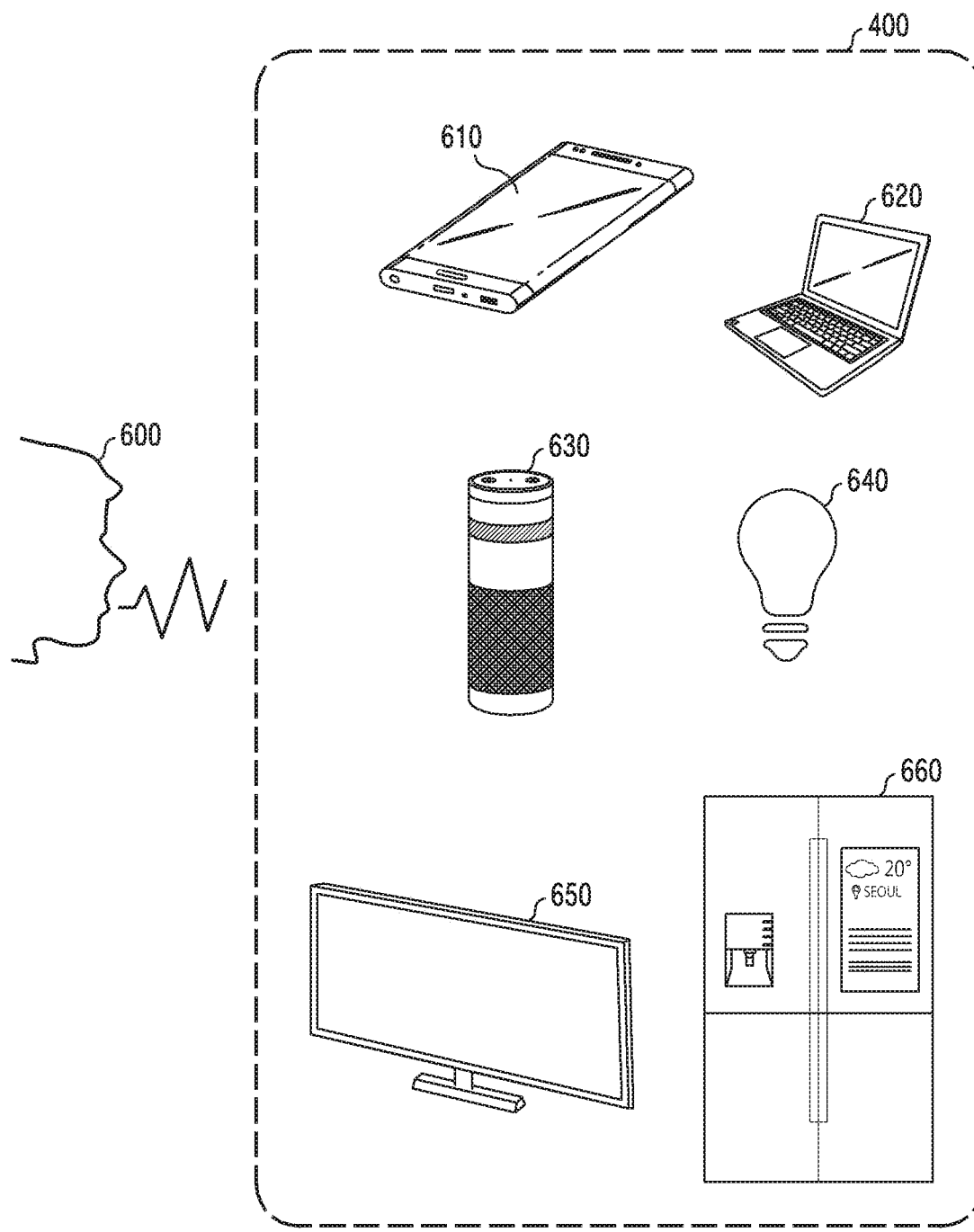
FIG. 6 illustrates an example of an electronic device according to various embodiments of the disclosure.

FIG. 6 illustrates an example of an electronic device according to various embodiments of the disclosure.

Referring to FIG. 6, in various embodiments, the electronic device 400 may include various devices having a component related to voice recognition and a microphone. In various embodiments, the electronic device 400 may include various types of devices capable of providing a voice recognition service by receiving a voice input based on user's utterance through the microphone. For example, the electronic device 400 may include a smartphone 610, a computer 620 (e.g., a personal computer, a notebook, etc.), a Bluetooth speaker 630, an IoT device 640, a television 650, a refrigerator 660, or the like. Although not shown, the electronic device 400 according to various embodiments and a voice recognition service method thereof may be implemented by using various devices such as a tablet PC, an automotive infotainment device, a washing machine, an air conditioner, or the like, in addition to the aforementioned structure.

According to various embodiments, the plurality of electronic devices 610, 620, 630, 640, 650, and 660 may be registered (or set) with the same or different wake-up words. According to an embodiment, the plurality of electronic devices 610, 620, 630, 640, 650, and 660 may be set with a specific wakeup word such as "hi", "hello", "hi ABC", or the like. In various embodiments, "ABC" may represent, for example, a name of an electronic device (or an agent of an electronic device (or an Artificial Intelligence (AI)). For example, it may represent a name given such as galaxy, Bixby, or the like.

According to various embodiments, the electronic devices 610, 620, 630, 640, 650, and 660 may be set to a state capable of recognizing a user's wake-up word. For example, the electronic devices 610, 620, 630, 640, 650, and 660 may be activated in a state of starting the voice recognition service by waking up substantially simultaneously on the basis of the user's wake-up word. According to an embodiment, the electronic devices 610, 620, 630, 640, 650, and 660 may be in a state of receiving an audio input via a microphone, and may detect an wake-up word by means of an wake-up engine (e.g., the first processor 510) from the audio input. A voice recognition engine (e.g., the second processor 520) may wake up by means of the wake-up engine. The voice recognition engine may receive a voice signal for utterance of a user 600 according to the wake-up, and may perform voice recognition.

According to various embodiments, the electronic devices 610, 620, 630, 640, 650, and 660 may be set as a group on the basis of an account of the user 600. For example, the electronic devices 610, 620, 630, 640, 650, and 660 may be grouped with the same account (e.g., samsung@samsung.com), and this may be registered to each of the electronic devices 610, 620, 630, 640, 650, and 660 and/or a server (e.g., a Samsung server, a cloud server, etc.) as information related to the voice recognition service. For example, the information related to the voice recognition service (hereinafter, referred to as service information) may be registered by including an account, device information (category), task information (e.g., previous task, follow-up task), a contextual command (or a domain), or the like. According to various embodiments, examples of analyzing the contextual command and processing the domain in response thereto will be described below with reference to the accompanying drawings.

According to various embodiments, the electronic devices 610, 620, 630, 640, 650, and 660 may be associated with a server and set to a standby state capable of receiving a response from the server. According to various embodiments, the electronic devices 610, 620, 630, 640, 650, and 660 may be coupled with one another and set to a standby state capable of receiving a response from other electronic devices.

According to an embodiment, the electronic devices 610, 620, 630, 640, 650, and 660 may be coupled with one another. For example, in various embodiments, the electronic devices 610, 620, 630, 640, 650, and 660 may be coupled with other electronic devices on the basis of wireless communication (e.g., Bluetooth, Bluetooth Low Energy (BLE), WiFi, etc.). In various embodiments, the electronic devices 610, 620, 630, 640, 650, and 660 may wirelessly communicate with different electronic devices, and may exchange a variety of information related to the voice recognition service with the different electronic devices. According to an embodiment, the electronic device 400 may transmit voice information recognized by itself to a different electronic device, and may receive voice information recognized by the different electronic device from the different electronic device. According to various embodiments, the electronic devices 610, 620, 630, 640, 650, and 660 may be directly coupled through wireless communication. According to various embodiments, the electronic devices 610, 620, 630, 640, 650, and 660 may be coupled through an Access Point (AP) which is commonly accessed.

According to various embodiments, the electronic devices 610, 620, 630, 640, 650, and 660 may be identified based on unique names (e.g., a nickname, a device identifier) of the respective devices. According to various embodiments, the electronic devices 610, 620, 630, 640, 650, and 660 may each include a domain list of domains that can be processed by themselves. For example, the electronic device 610, 620, 630, 640, 650, and 660 may be set with a domain list on the basis of executable functions. In various embodiments, a domain may represent a function or task which can be executed by the electronic devices 610, 620, 630, 640, 650, and 660 by using the voice recognition service. According to an embodiment, in case of a phone, a domain of a phone, message, music, or the like may be set. According to an embodiment, in case of TV, a domain of a channel, volume, music, or the like, may be set. According to an embodiment, in case of a refrigerator, a domain of a recipe, temperature control, weather, or the like may be set.

As described above, an electronic device according to various embodiments of the disclosure may include the microphone 443, the memory 40, and the processor 480 operatively coupled to the microphone 443 and the memory 450. The processor 480 may be configured to wake-up on the basis of detection of a wake-up word, process a first task corresponding to a first voice command of a user on the basis of the wake-up, set a wait time during which a follow-up command can be received on the basis of the processing of the first task, detect a second voice command of the user during the wait time, analyze a conversational context on the basis of the first voice command and second voice command, and process a second task on the basis of a result of the analysis.

According to various embodiments, the processor may be configured to include the first processor 510 which recognizes the wake-up word and the second processor 520 which wakes up on the basis of wake-up word detection of the first processor 510 and processes voice recognition and an operation related to a voice recognition service.

According to various embodiments, the second voice command may be a command in which the wake-up word and a redundant command are omitted.

According to various embodiments, the processor may be configured to enter a follow-up command processing mode for detecting a voice command in which a trigger for the wake-up is omitted during the wait time upon processing the first task on the basis of the first voice command, and recognize the second voice command in which the wake-up word and a redundant command are not included in the follow-up command processing mode.

According to various embodiments, the processor may be configured to set the wait time to a pre-set wait time or change the wait time to a time value different from the wait time.

According to various embodiments, the processor may be configured to determine the changed time value of the wait time on the basis of context cognition.

According to various embodiments, the processor may be configured to compare the conversational context on the basis of voice commands which are input during the wait time, and determine an association of a previous conversational context and an additional conversational context on the basis of a result of the comparison.

According to various embodiments, the processor may be configured to process the second task based on a functional unit, a domain unit, or domain switching on the basis of the result of the comparison.

According to various embodiments, the processor may be configured to provide a feedback indicating that an input of a follow-up command can be input without the wake-up word, on the basis of at least one output scheme, during the wait time.

According to various embodiments, the processor may be configured to activate a voice user interface on the basis of the wake-up, and operate the voice user interface in background during the wait time in response to execution of the task based on the first voice command.

Figure 7:
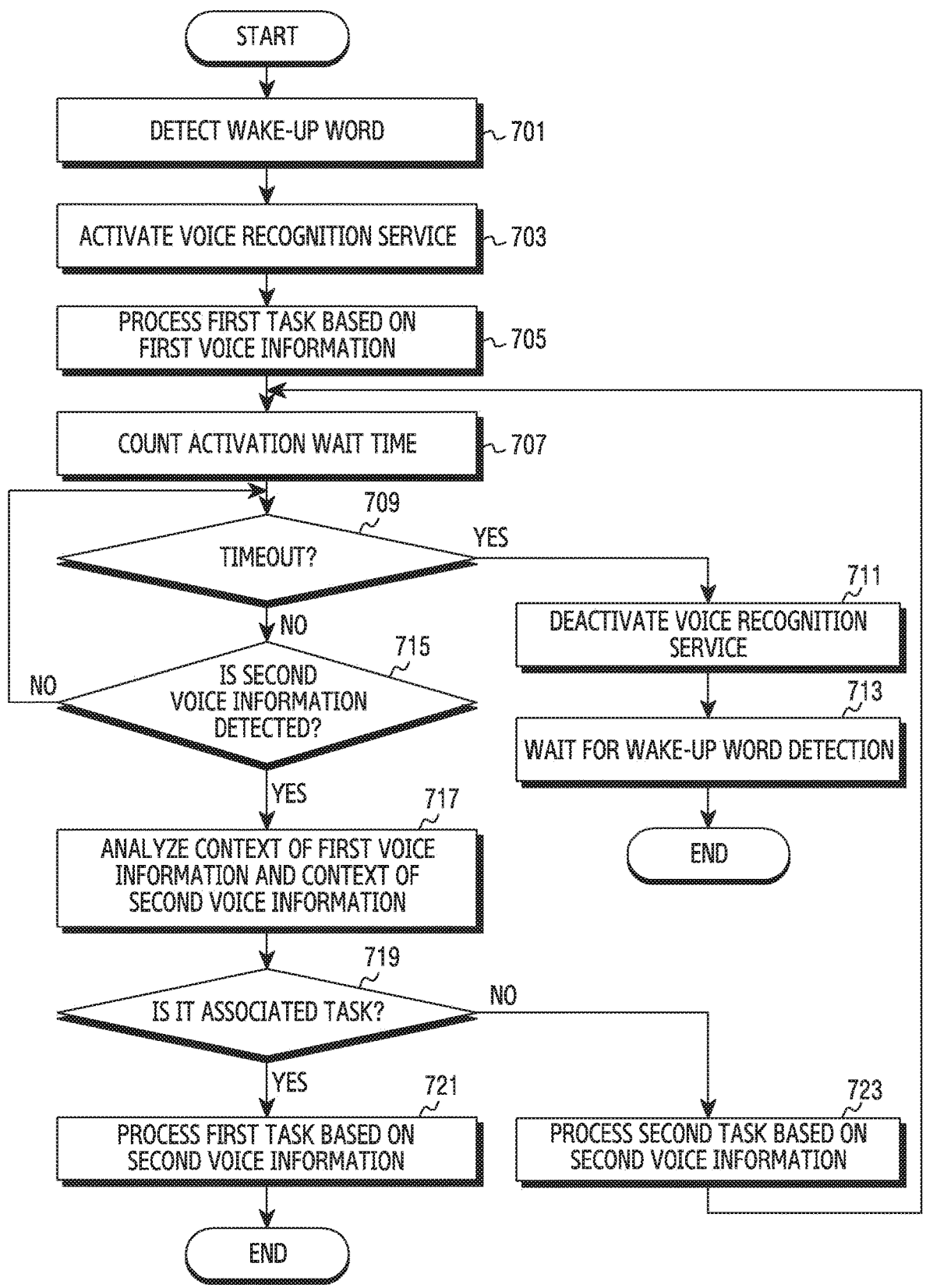
FIG. 7 is a flowchart illustrating an operation of providing a voice recognition service in an electronic device according to various embodiments of the disclosure.

FIG. 7 is a flowchart illustrating an operation of providing a voice recognition service in an electronic device according to various embodiments of the disclosure.

Referring to FIG. 7, in operation 701, the processor 480 of the electronic device 400 may detect a wake-up word. According to an embodiment, the electronic device 400 may recognize the wake-up word through a microphone, on the basis of a first processor (e.g., a wake-up processing unit, a wake-up engine) for recognizing the wake-up word.

In operation 703, the processor 480 may activate a voice recognition service. For example, the processor 480 may wake up in response to wake-up word detection. According to an embodiment, the electronic device 400 may wake up a second processor (e.g., a follow-up command recognizing unit, a voice recognition engine, a service control circuit, etc.) on the basis of the wake-up word detection of the first processor (e.g., the wake-up engine). According to various embodiments, the processor 480 may initiate voice recognition based on user's utterance, in response to the wake-up.

In operation 705, the processor 480 may process a first task on the basis of first voice information. According to an embodiment, after the wake-up, the processor 480 may recognize the first voice information based on the user's utterance, and may process at least one first task related to execution of a function corresponding to the first voice information. For example, if "jazz music playback" is recognized according to user's utterance, the processor 480 may process music application execution and music playback. For another example, if "volume up" of music being played back is recognized according to user's utterance, the processor 480 may increase a volume value of a music application according to a set value.

In operation 707, the processor 480 may count an activation wait time. According to various embodiments, the processor 480 may start to count the wait time in sequence or in parallel with first task processing. In various embodiments, the activation wait time may include a specific time which is set for recognition of a follow-up command after the wake-up, or after a task is performed following the wake-up. For example, it may include a wait time during which the voice recognition service is maintained after the wake-up. According to various embodiments, the wait time may be set variously such as N seconds (e.g., 10 seconds, 30 seconds, 1 minute, 5 minutes, etc.). According to various embodiments, the electronic device 400 may pre-define timing at which additional user's utterance mostly occurs after the task is performed.

In operation 709, the processor 480 may determine whether a timeout occurs in response to the count of the activation wait time. For example, the processor 480 may determine whether a time (e.g., 10 seconds, 1 minute, 5 minutes, etc.) which is set to the activation wait time elapses.

Upon determining that the timeout occurs in operation 709 (i.e., Yes in operation 709), the processor 480 may deactivate a voice recognition service in operation 711. According to an embodiment, the electronic device 400 may maintain the active state of the first processor, and may deactivate the second processor.

In operation 713, the processor 480 may wait for the wake-up word detection.

Upon determining that the timeout does not occur in operation 709 (i.e., No in operation 709), the processor 480 may determine whether second voice information is detected in operation 715. According to an embodiment, the processor 480 may receive new voice information which is input based on user's utterance without an additional wake-up word during an active state of the voice recognition service.

Upon determining that the second voice information is not detected in operation 715 (i.e., No in operation 715), proceeding to operation 709, the processor 480 may perform operation 709 and its subsequent operations.

Upon determining that the second voice information is detected in operation 715 (i.e., Yes in operation 715), the processor 480 may analyze a context of the first voice information and a context of the second voice information. According to an embodiment, the processor 480 may compare a context of a previous conversation and a context of a current conversation. According to an embodiment, the processor 480 may record user's utterance and convert it into a sentence, and may determine whether a pre-set contextual command has a sentence corresponding to the converted sentence.

In operation 719, the processor 480 may determine whether it is an associated task on the basis of the context analyzing. For example, the processor 480 may determine whether corresponding conversational contexts are associated with each other on the basis of a result of comparing the context of the first voice information and the context of the second voice information. According to various embodiments, the processor 480 may determine whether the contexts are associated on the basis of a pre-defined contextual command for each domain as described below. This will be described in detail with reference to the accompanying drawings.

Upon determining that it is the associated task in operation 719 (i.e., Yes in operation 719), the processor 480 may process the first task on the basis of the second voice information in operation 721. According to an embodiment, if the user utters "hip-hop", without the wake-up word, as an additional follow-up command during the voice recognition service, the processor 480 may play back music by switching from jazz music to hip-hop music, in the first task (e.g., music playback) which is being executed. For example, in various embodiments, when in an active state of a voice recognition service after the wake-up, a command for an associated task may be processed by utilizing a previous conversational context, without having to use the wake-up word and the task executing command (e.g., music playback).

Upon determining that it is not the associated task in operation 719 (i.e., No in operation 719), the processor 480 may process the second task on the basis of the second voice information in operation 723. According to an embodiment, when the user utters "show my schedule", without the wake-up word, as an additional follow-up command during the voice recognition service, the processor 480 may stop the first task, or may process the second task while processing the first task in background. For example, upon recognizing "show my schedule" according to the user's utterance, the processor 480 may process the executing and displaying of a schedule application.

According to various embodiments, the wait time may be reset. According to an embodiment, upon executing the task, the processor 480 may reset a wait time count in sequence or in parallel with completion of the task. According to various embodiments, when the wait time is reset, the wait time may be set to a pre-set wait time value (e.g., N minutes), or may be set to a time (e.g., M minutes) greater than or less than the pre-set wait time value (e.g., N minutes). For example, the wait time may be set variably. According to an embodiment, the processor 480 may set the wait time value, based at least in part of context cognition (e.g., a task type, a currently running application, a time different of a follow-up command input, etc.). According to various embodiments, a variable wait time table may be pre-stored. The processor 480 may calculate a score based on context cognition, and may change the wait time value on the basis of the calculated score and the pre-set variable wait time table.

According to various embodiments, in the active state of the voice recognition service, a jump between domains may be provided in response to a follow-up command without the wake-up word. For example, it may be executed by switching from a music domain to a schedule domain on the basis of a result of voice recognition.

According to various embodiments, in the active state of the voice recognition service, if a follow-up command which is input without the wake-up word is not associated with a previous conversational context, for example, if it is not an associated task, it may be configured to ignore a corresponding command. According to an embodiment, if there is no sentence based on a follow-up command in a pre-defined domain list (e.g., a contextual command for each domain), the processor 480 may ignore a corresponding command, and may delete a recorded audio file. In various embodiments, the deletion of the recorded audio file may be considered for privacy protection, an increase in memory management efficiency, or the like.

Figure 8A:
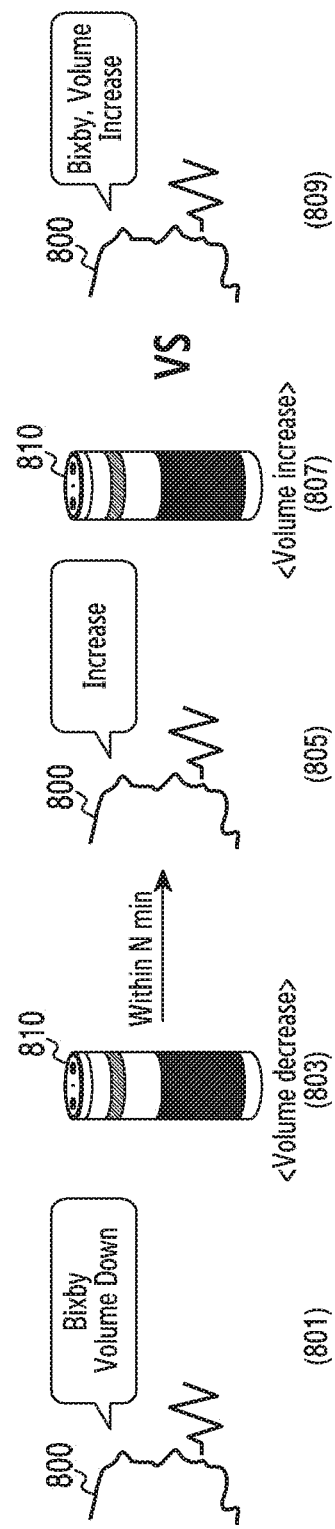
FIG. 8A, FIG. 8B and FIG. 8C are a drawing for explaining an exemplary operation for providing a voice recognition service according to various embodiments of the disclosure.
Figure 8B:
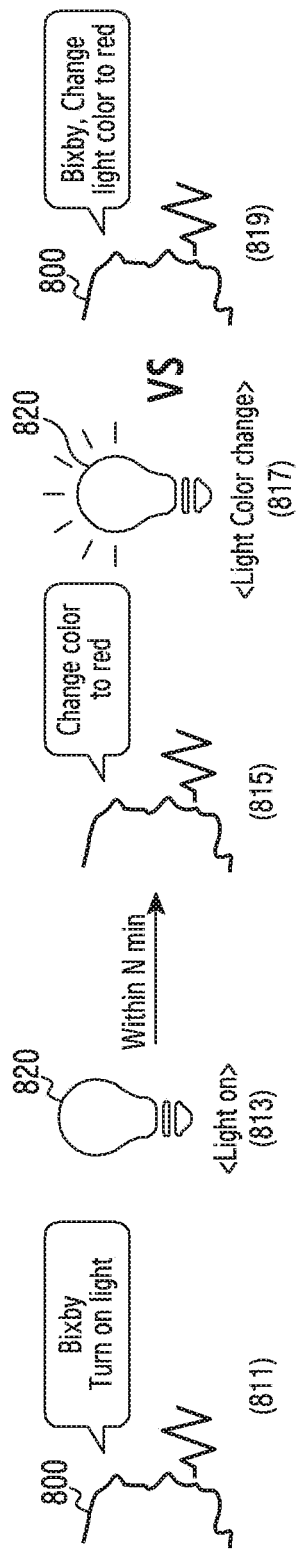
Figure 8C:
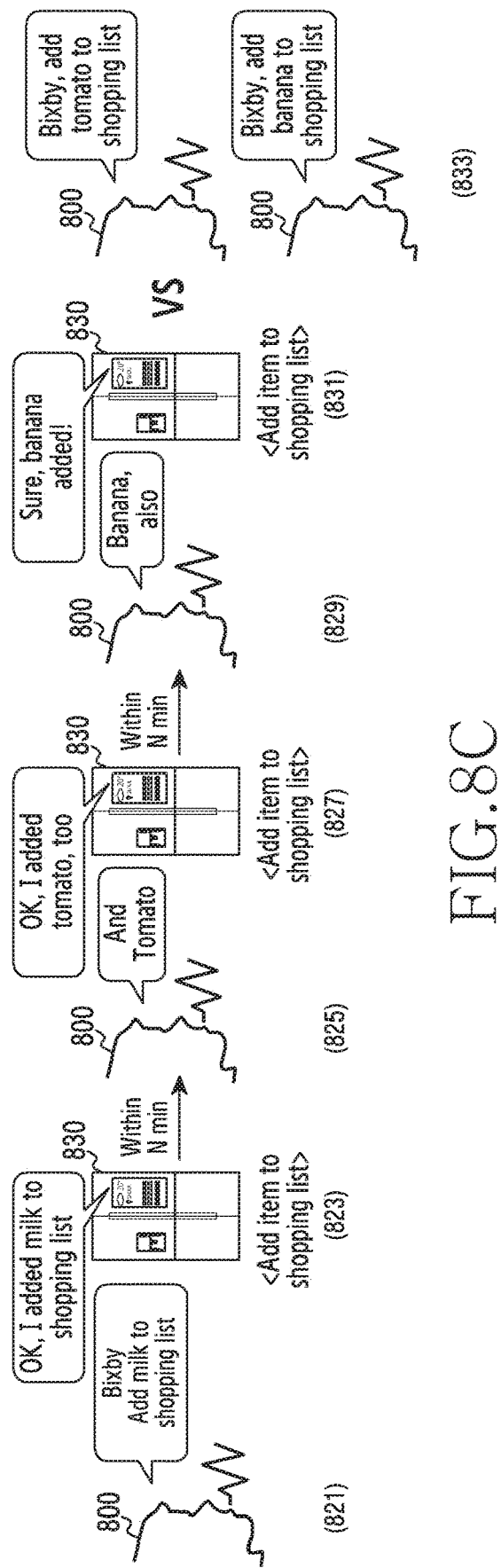

FIG. 8A, FIG. 8B, and FIG. 8C are drawings for explaining an exemplary operation for providing a voice recognition service according to various embodiments of the disclosure.

As shown in FIG. 8A, FIG. 8B, and FIG. 8C, the electronic device 400 may be implemented by various devices such as a first electronic device 810 (e.g., a speaker), a second electronic device 820 (e.g., an IoT device), a third electronic device 830 (e.g., a refrigerator), or the like. In FIG. 8A, FIG. 8B, and FIG. 8C, for example, "Bixby" is set as a wake-up word of the electronic device 400 (e.g., the first electronic device 810, the second electronic device 820, and the third electronic device 830). According to various embodiments, the wake-up word may be provided depending on the configuration of the electronic device 400, and may be changed by the user. According to various embodiments, the first electronic device 810, the second electronic device 820, and the third electronic device 830 may include respective microphones (not shown), and may receive an audio input depending on utterance of a user 800 through the respective microphones.

According to various embodiments, the user 800 may utter a specific command to initiate a voice recognition service by means of a specific electronic device. According to an embodiment, the user 800 may utter a wake-up word (e.g., Bixby) which is set to wake up the electronic device. According to an embodiment, the user 800 may utter the wake-up word and a follow-up command (e.g., a command related to execution of a function based on the voice recognition service). For example, the example of FIG. 8A, FIG. 8B, and FIG. 8C may be an exemplary case where the user utters the wake-up word and the follow-up command together.

According to various embodiments, the first electronic device 810, the second electronic device 820, and the third electronic device 830 may transmit the follow-up command (or voice information) which is input according to user's utterance to a server (not shown), or may receive a result of voice recognition by means of the server. In various embodiments, for example, there may be a case where voice recognition is performed by the first electronic device 810, the second electronic device 820, and the third electronic device 830 and a process thereon is possible.

Referring to FIG. 8A, in operation 801, the user 800 may utter a command (e.g., a wake-up word+a follow-up command) for wake-up and task (or function) execution in the first electronic device 810 in order to initiate a voice recognition service (e.g., device volume control) by means of the first electronic device 810 (e.g., a speaker). According to an embodiment, the user 800 may utter such as "Bixby, Volume Down". Herein, "Bixby" may correspond to the wake-up word, and "Volume Down" may correspond to the follow-up command.

According to various embodiments, the first electronic device 810 may receive an audio input based on the utterance of the user 800 through a microphone (not shown). According to various embodiments, the first electronic device 810 may wake up in response to the wake-up word (e.g., Bixby) of the user 800.

According to various embodiments, the first electronic device 810 may perform voice recognition for a follow-up command (e.g., Volume Down) of the user 800 on the basis of the wake-up. The first electronic device 810 may perform a related task on the basis of a recognition result. According to an embodiment, in operation 803, the first electronic device 810 may decrease a volume of music in response to a command "Volume Down".

According to various embodiments, after waking up based on the wake-up word, the first electronic device 810 may wait for a pre-set wait time (e.g., N seconds) to maintain an active state of the voice recognition service, for example, to consecutively recognize a follow-up command to be added even after a task is processed. In operation 805, within the wait time (e.g., N seconds), the user 800 may omit the wake-up word (e.g., Bixby) and a redundant sentence (or word) (e.g., a task command or a domain command) (e.g., Volume), and may utter an additional follow-up command, for example, "Increase".

The first electronic device 810 may recognize the additional follow-up command (e.g., Increase), and may consecutively perform a related task on the basis of a recognition result. According to an embodiment, upon detecting an input of the additional follow-up command within the wait time, the first electronic device 810 may determine an association of a task by analyzing a context based on a previously input command (hereinafter, a previous conversational context) (e.g., Volume Down) and a context based on a command additionally input within the wait time (hereinafter, an additional conversational context). According to an embodiment, the first electronic device 810 may determine an association between the previous conversational context and the additional conversational context on the basis of a pre-set domain list (e.g., a contextual command for each domain). This will be described below with reference to FIG. 9 and FIG. 10.

In operation 807, the first electronic device 810 may determine an additional command (e.g., an additional conversational context) as a task of volume control in association with a task (e.g., volume control) executed according to a previous command (e.g., a previous conversational context), and may increase a volume of music in response to a command "Increase".

As described above with reference to FIG. 8A, the user 800 may intend to consecutively perform an associated task, after performing a task by waking up the first electronic device 810 on the basis of the wake-up word. In the conventional method, as exemplified in operation 809, the first electronic device 810 may be able to process a task only when the user 800 completely utters again the wake-up word (e.g., Bixby) and the entire command (e.g., Volume Increase) related to the task. On the other hand, according to various embodiments, the user 800 does not have to utter the wake-up word (e.g., Bixby), and may consecutively perform an associated task by simply uttering only a direct command (e.g., Increase) to be performed while omitting a redundant sentence (e.g., Volume). For example, in various embodiments, without the wake-up word for waking up (or calling) the electronic device 400 and repetitive utterance for a control target (or an object, a task) (e.g., Volume), a voice recognition service of the electronic device 400 may be provided by uttering only a direct command (e.g., Increase) related to execution of a corresponding control target.

Referring to FIG. 8B, in operation 811, the user 800 may utter a command (e.g., a wake-up word+a follow-up command) for wake-up and task (or function) execution in the second electronic device 820, in order to initiate a voice recognition service (e.g., a light control of a device) by means of the second electronic device 820 (e.g., an IoT device). According to an embodiment, the user 800 may utter such as "Bixby, Turn on light". Herein, "Bixby" may correspond to the wake-up word, and "Turn on light" may correspond to the follow-up command. According to various embodiments, the second electronic device 820 may wake up in response to the wake-up word (e.g., Bixby) of the user 800.

According to various embodiments, the second electronic device 820 may recognize a follow-up command (e.g., Turn on light) of the user 800 on the basis of the wake-up. The second electronic device 820 may perform a related task on the basis of a recognition result. According to an embodiment, in operation 803, the second electronic device 820 may turn on the light of the second electronic device 820, in response to the command "Turn on light".

According to various embodiments, the second electronic device 820 may wait for a pre-set wait time (e.g., N seconds) during which an active state of the voice recognition service is maintained. In operation 815, within the wait time (e.g., N seconds), the user 800 may omit the wake-up word (e.g., Bixby) and a redundant sentence (or word) (e.g., light), and may utter an additional follow-up command, for example, "Change color to red".

The second electronic device 820 may recognize the additional follow-up command (e.g., Change color to red), and may consecutively perform a related task on the basis of a recognition result. According to an embodiment, upon detecting an input of the additional follow-up command within the wait time, the second electronic device 820 may determine an association of a task by analyzing a previous conversational context based on a previously input command (e.g., Turn on light) and a previous conversational context based on a command additionally input within the wait time (e.g., Change color to red). According to an embodiment, the second electronic device 820 may determine an association between the previous conversational context and the additional conversational context on the basis of a pre-set domain list (e.g., a contextual command for each domain). This will be described below with reference to FIG. 9 and FIG. 10.

In operation 817, the second electronic device 820 may determine an additional command (e.g., an additional conversational context) as a task of light control in association with a task (e.g., light control) executed according to a previous command (e.g., a previous conversational context), and may output the light by changing color to red in response to a command "Change color to red".

As described above with reference to FIG. 8B, the user 800 may intend to consecutively perform an associated task, after performing a task by waking up the second electronic device 820 on the basis of the wake-up word. In the conventional method, as exemplified in operation 819, the second electronic device 820 may be able to process a task only when the user 800 completely utters again the wake-up word (e.g., Bixby) and the entire command (e.g., Change light color to red) related to the task. On the other hand, according to various embodiments, the user 800 does not have to utter the wake-up word (e.g., Bixby), and may consecutively perform an associated task by simply uttering only a direct command (e.g., Change light color to red) to be performed while omitting a redundant sentence (e.g., light). For example, in various embodiments, without the wake-up word for waking up (or calling) the electronic device 400 and repetitive utterance for a control target (or an object, a task) (e.g., light), a voice recognition service of the electronic device 400 may be provided by uttering only a direct command (e.g., Change color to red) related to execution of a corresponding control target.

Referring to FIG. 8C, in operation 821, the user 800 may utter a command (e.g., a wake-up word+a follow-up command) for wake-up and task (or function) execution in the third electronic device 830, in order to initiate a voice recognition service (e.g., shopping list creation (management) control) by means of the third electronic device 830 (e.g., a refrigerator). According to an embodiment, the user 800 may utter such as "Bixby, Add milk to shopping list". Herein, "Bixby" may correspond to the wake-up word, and "Add milk to shopping list" may correspond to the follow-up command. According to various embodiments, the third electronic device 830 may wake up in response to the wake-up word (e.g., Bixby) of the user 800.

According to various embodiments, the third electronic device 830 may recognize a follow-up command (e.g., Add milk to shopping list) of the user 800 on the basis of the wake-up. According to an embodiment, in operation 823, the third electronic device 830 may add a corresponding item (e.g., milk) to a shopping list in response to a command "Add milk to shopping list".

According to various embodiments, the third electronic device 830 may wait for a pre-set wait time (e.g., N seconds) during which an active state of the voice recognition service is maintained. In operation 825, within the wait time (e.g., N seconds), the user 800 may omit the wake-up word (e.g., Bixby) and a redundant sentence (or word) (e.g., shopping list), and may utter an additional follow-up command, for example, "And Tomato".

The third electronic device 830 may recognize the additional follow-up command (e.g., And Tomato), and may consecutively perform a related task on the basis of a recognition result. According to an embodiment, upon detecting an input of the additional follow-up command within the wait time, the third electronic device 830 may determine an association of a task by analyzing a previous conversational context based on a previously input command (e.g., Add milk to shopping list) and an additional conversational context based on a command additionally input within the wait time (e.g., And Tomato). According to an embodiment, the third electronic device 830 may determine an association between the previous conversational context and the additional conversational context on the basis of a pre-set domain list (e.g., a contextual command for each domain). This will be described below with reference to FIG. 9 and FIG. 10.

In operation 827, the third electronic device 830 may determine an additional command (e.g., an additional conversational context) as a task of "Add item to shopping list" in association with a task (e.g., Add item to shopping list) executed according to a previous command (e.g., a previous conversational context), and may add tomato to the shopping list in response to a command "And Tomato".

According to various embodiments, the third electronic device 830 may wait for a pre-set wait time (e.g., N seconds) during which an active state of the voice recognition service is maintained. In operation 829, within the wait time (e.g., N seconds), the user 800 may omit the wake-up word (e.g., Bixby) and a redundant sentence (or word) (e.g., shopping list), and may utter an additional follow-up command, for example, "Banana, also". According to various embodiments, the user 800 may freely utter, without being limited to any particular form, when uttering an additional command. For example, a preceding additional command may be uttered such as "And Tomato", and a follow-up additional command may be uttered such as "Banana, also". According to an embodiment, only a corresponding item to be added to the shopping list may be included, and other sentences may be omitted or freely uttered.

According to various embodiments, upon executing an additional task based on an additional conversational context, the electronic device 400 may initialize a wait time count in sequence or in parallel with completion of the additional task. According to an embodiment, the electronic device 400 may re-start the wait time count from the beginning at a time of completing the additional task. According to various embodiments, the electronic device 400 may equally set a wait time value (e.g., N seconds (minutes)) or may set the value by changing to another value, when the wait time is initialized. For example, the electronic device 400 may re-start a count to a first wait time (e.g., N seconds (minutes)) or may set the count to a value different from (e.g., a value greater than or less than) the first wait time, when the first waiting count is initialized, in response to detection of user's utterance within the first wait time (e.g., N seconds). According to an embodiment, the electronic device 400 may set the count to N' seconds (minutes) (e.g., N+X, N+Y, etc.) greater than the first wait time. According to another embodiment, the electronic device 400 may set the count to N" seconds (e.g., N−X seconds (where N is a natural number greater than X), N−Y seconds (where N is a natural number greater than Y), etc.) less than the first wait time.

In various embodiments, the second wait time which is changed after the first wait time may be changed statically according to a configuration of the electronic device 400, or may be adaptively changed on the basis of context cognition (or context awareness) of the electronic device 400. According to an embodiment, the electronic device 400 may set the second wait time to be shorter than, equal to, or longer than the first wait time, on the basis of a time (e.g., an early part of the wait time, a middle part of the wait time, a last part of the wait time) at which an additional command is uttered within the first wait time.

The third electronic device 830 may recognize an additional follow-up command (e.g., Banana, also), and may consecutively perform a related task on the basis of a recognition result. According to an embodiment, upon detecting an input of the additional follow-up command within the wait time, the third electronic device 830 may determine an association of a task by analyzing a previous conversational context based on a previously input command (e.g., at least one of "Add milk to shopping list" and "And Tomato") and an additional conversational context based on a command additionally input within the wait time (e.g., Banana, also).

In operation 831, the third electronic device 830 may determine an additional command (e.g., an additional conversational context) as a task of "Add item to shopping list" in association with a task (e.g., Add item to shopping list) executed according to a previous command (e.g., a previous conversational context), and may add banana to the shopping list in response to a command "Banana, also".

As described above with reference to FIG. 8C, the user 800 may intend to consecutively perform an associated task, after performing a task by waking up the third electronic device 830 on the basis of the wake-up word. In the conventional method, as exemplified in operation 833, the third electronic device 830 may be able to process a task only when the user 800 utters again the wake-up word (e.g., Bixby) and the entire command (e.g., Add tomato to shopping list) related to the task and repeatedly utters again the wake-up word (e.g., Bixby) and the entire command (e.g., Bixby, Add banana to shopping list) related to the task. For example, the user 800 may perform a repetitive task for which a command is consecutively required or for which an additional command is often (frequently) required such as registering of a plurality of items to a shopping list, controlling music playback, or adjusting of screen brightness of the electronic device 400 (e.g., TV). In the conventional method, inconveniently, a wake-up word for waking up the electronic device 400 has to be repeatedly uttered whenever a task is performed, and the entire sentence including a redundant sentence (or word) has to be uttered.

On the other hand, according to various embodiments, the user 800 does not have to utter the wake-up word (e.g., Bixby), and may consecutively perform an associated task by simply uttering only a direct command (e.g., Tomato, Banana) to be performed while omitting a redundant sentence (e.g., add, shopping list). For example, in various embodiments, without the wake-up word for waking up (or calling) the electronic device 400 and repetitive utterance for a control target (or an object, a task) (e.g., add, shopping list), a voice recognition service of the electronic device 400 may be provided by uttering only a direct command (e.g., Tomato, Banana) related to execution of a corresponding control target.

According to various embodiments, the electronic device 400 (e.g., the third electronic device 830) may provide the user 800 with a feedback indicating a result for recognition of a command of the user. For example, as exemplified in FIG. 8C, the third electronic device 810 may receive a user's command, and as illustrated in operations 841, 843, and 845, may provide the user 800 with a feedback for execution of the task as a result for voice recognition. In various embodiments, the feedback for execution of the task may be provided at least in part based on a visual output, auditory output, or tactile output according to a type of the electronic device 400. According to an embodiment, as illustrated in operations 841, 843, and 845, the third electronic device 830 may provide an adaptive feedback according to a context, such as "OK, I added milk to shopping list", "OK, I added tomato, too", and "Sure, banana added". According to various embodiments, the feedback for execution of the task of the electronic device 400 may be provided adaptively based on context cognition, and may be provided based on a result of voice recognition based on interaction between the user 800 and the electronic device 400.

FIG. 9 illustrates an example of explaining a domain list according to various embodiments of the disclosure.

Referring to FIG. 9, FIG. 9 may show an example of a domain list in which a command and a context timeout are configured for consecutively performing a related task while omitting a wake-up word and a redundant sentence (or word) according to various embodiments. For example, FIG. 9 may show an example of a database in which an additional command and a timeout are configured according to types of an electronic device and a previous task.

As shown in FIG. 9, the domain list may include a device item 910 for identifying the electronic device, a previous task item 920, an in-context timeout item 930, a contextual command item 940, a follow-up task item 950, or the like.

According to an embodiment, in case of a speaker, it can be exemplified that a previous task is "Volume", and for the task "Volume", a wait time for recognizing a command based on a follow-up task while omitting a wake-up word is set to 1 minute. In addition, it can be exemplified that a contextual command related to the "Volume" of the speaker includes "Up", "Increase", "More", "Louder", "Down", "Decrease", "Less", "Quiet", "Mute", or the like, and follow-up tasks to be performed according to a group of each contextual command are respectively set to "Volume up" and "Volume down".

According to an embodiment, "Up", "Increase", "More", "Louder", or the like may be set as a contextual command related to volume-up control, and the electronic device 400 may determine that a follow-up task is "Volume up" upon recognizing any one of corresponding commands. According to an embodiment, "Down", "Decrease", "Less", "Quiet", "Mute", or the like may be set as a contextual command related to volume-down control, and the electronic device 400 may determine that the follow-up command is "Volume down" upon recognizing any one of corresponding commands.

Likewise, in case of a mobile, it can be exemplified that a previous task is "Light", and for the task "Light", a wait time for recognizing a command based on a follow-up task while omitting a wake-up word is set to 5 minutes. In addition, it can be exemplified that a contextual command related to the "Light" of the mobile includes "Dim Up", "Brighter", "Increase brightness", or the like, and a follow-up task to be performed according to a contextual command is set to "Light brightness up". According to an embodiment, "Dim Up", "Brighter", "Increase brightness", or the like may be set as a contextual command related to light brightness control, and the electronic device 400 may determine that a follow-up task is "Light brightness up" upon recognizing any one of corresponding commands.

According to various embodiments, for a specific domain (or function) for which an additional task is expected, a related additional uttered sentence may be configured to be processed through a contextual command recognition engine (e.g., a second processor, an ASR, a follow-up command processing unit, a voice recognition server, etc.) other than a wake-up engine (e.g., a first processor).

According to various embodiments, after the electronic device 400 performs a task, a wait time for timeout management may be predefined based on timing at which a user's additional utterance mainly occurs, or the wait time may be variable depending on a corresponding context on the basis of context cognition.

FIG. 10 is a diagram for explaining a task processing method for each context in an electronic device according to various embodiments of the disclosure.

According to various embodiments, a range by which a user is capable of giving a certain follow-up command may vary depending on an implementation situation for each electronic device. Thus, it can be implemented by using various methods to process a follow-up command according to a contextual command for each domain in various embodiments.

According to an embodiment, it can be implemented such that the follow-up command is possible only for the same (identical) function in each domain (or device). For example, as exemplified in FIG. 10, it can be implemented such that the follow-up command for the same function of "Volume control" is possible, such as "Volume down" and "Volume up" associated with the function of "Volume" in the domain "Music". For example, a functional unit may be applied as exemplified by a group indicated by a reference numeral 1010 to process only a follow-up command corresponding to the same function.

According to an embodiment, it can be implemented such that only a follow-up command corresponding to the same domain is possible even though movement (or switching) between devices in the same (identical) domain (or device) is possible. For example as exemplified in FIG. 10, switching between a function "Volume" and a function "Play control" may be provided in the domain "Music". For example, it can be implemented such that a follow-up command caused by movement between the function "Volume control" and the function "Play control" is possible, such as "Volume down" and "Next song". For example, a domain unit may be applied as exemplified by a group indicated by a reference numeral 1020 to process various follow-up commands corresponding to respective functions in a domain.

According to an embodiment, it can be implemented such that a follow-up command is possible based on movement (or switching) between respective domains (or devices). For example, as exemplified in FIG. 10, switching may be provided between the domains "Music" and "Schedule". For example, it can be implemented such that a follow-up command is possible based on movement between domains, i.e., from "Volume control" such as "Volume down" of the domain "Music" to "Schedule management" such as "Schedule meeting 9 am" of the domain "Schedule". For example, domain switching may be applied as exemplified by a group indicated by a reference numeral 1030 to process a follow-up command by identifying only a command and a conversation with a user FIG. 11 illustrates an operation for providing a voice recognition service in an electronic device according to various embodiments of the disclosure.

Figure 11:
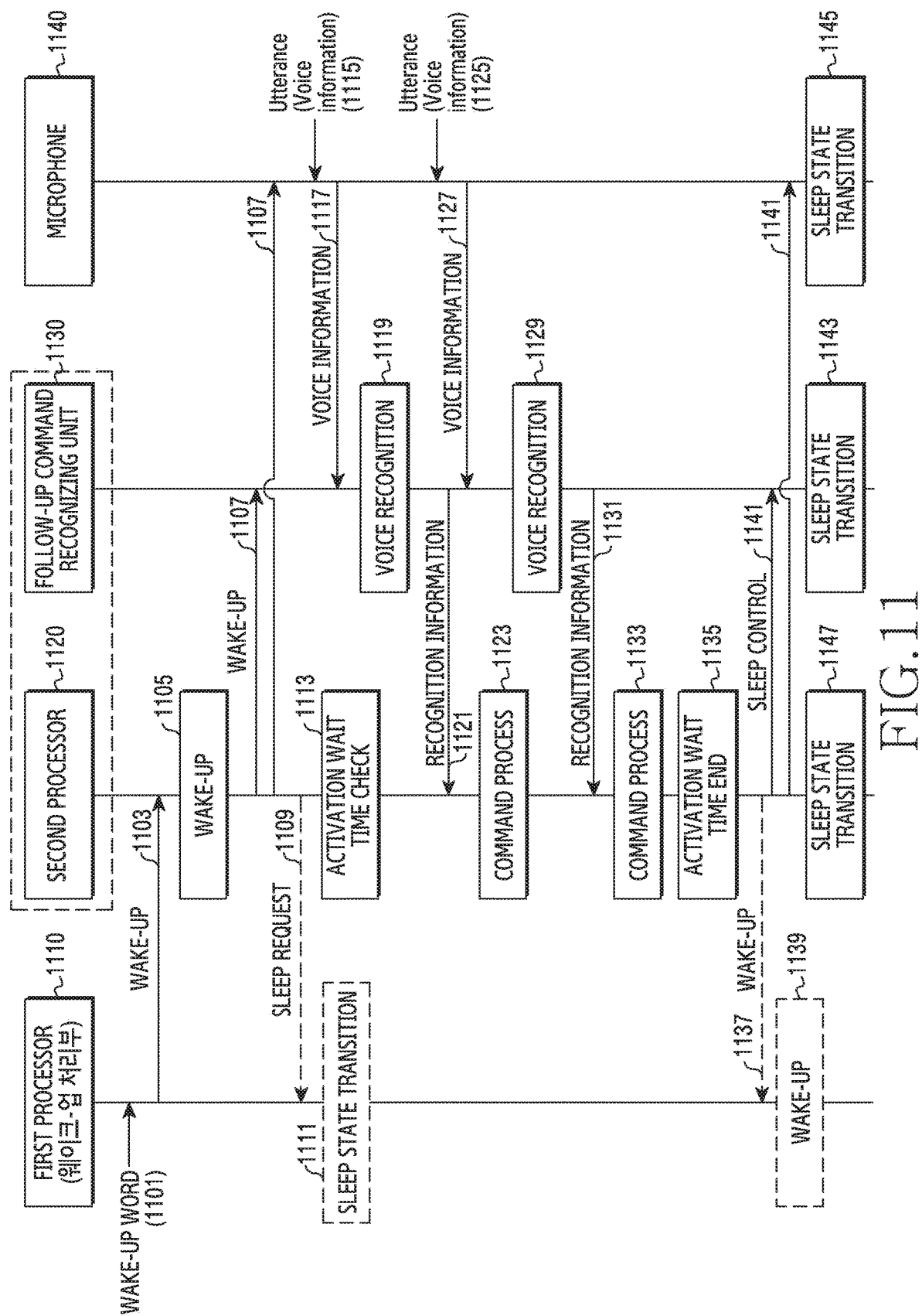
FIG. 11 illustrates an operation for providing a voice recognition service in an electronic device according to various embodiments of the disclosure.

As shown in FIG. 11, the electronic device 400 may include a first processor 1110 (e.g., a wake-up processing unit), a second processor 1120, a follow-up command recognizing unit 1130, and a microphone 1140. According to various embodiments, the second processor 1120 and the follow-up command recognizing unit 1130 may be included by one module (or chip).

Referring to FIG. 11, in operation 1101, a user may utter a wake-up word to initiate the voice recognition service by means of the electronic device 400. According to various embodiments, the user may utter the wake-up word and a follow-up command together, or may separately utter the follow-up command after waking up the electronic device 400 on the basis of the wake-up word.

In operation 1103, the first processor 1110 may transfer a wake-up signal for waking up the second processor 1120 to the second processor 1120, on the basis of detection of the wake-up word. According to various embodiments, the electronic device 400 may additionally have a microphone (or a sound sensor) to receive the wake-up word or may receive the wake-up word through the microphone 1140. Herein, before the wake-up of the electronic device 400, the microphone 1140 may be in a state of transferring an audio input only to the first processor 1110 without performing preprocessing on the audio input (e.g., a functionally turn-off state). For example, the microphone 1140 may operate in a low-power state in an inactive state of a voice recognition service.

In operation 1105, the second processor 1120 may wake up on the basis of the wake-up signal of the first processor 1110.

In operation 1107, the second processor 1120 may control a related operation so that the follow-up command recognizing unit 1130 and the microphone 1140 wake up on the basis of the wake-up. According to an embodiment, the second processor 1120 may transfer the wake-up signal to each of the follow-up command recognizing unit 1130 and the microphone 1140. According to various embodiments, an off state of the microphone 1140 may include a functionally turn-off state, and the wake-up of the microphone 1140 may include a functionally turn-on state.

In operation 1109, the second processor 1120 may process a sleep state transition of the first processor 1110 on the basis of the wake-up. According to an embodiment, the second processor 1120 may transfer a sleep request to the first processor 1110. According to an embodiment, the state transition of the first processor 1110 may be performed independently by the first processor 1110. In this case, the sleep request operation of the second processor 1120 in operation 1109 may not be performed.

In operation 1111, the first processor 1110 may transition to the sleep state. According to various embodiments, the first processor 1110 may transition to the sleep state, in response to the sleep request of the second processor 1120. According to various embodiments, the first processor 1110 may transition to the sleep state automatically, when the wake-up is processed by the second processor 1120 or the like on the basis of detection of the wake-up word.

According to various embodiments, the first processor 1110 for detecting the wake-up word may maintain an always-on state. In this case, in various embodiments, operations 1109 and 1111 related to the sleep operation of the first processor 1110 may not be performed but be skipped.

In operation 1113, the second processor 1120 may check an activation wait time. According to various embodiments, the second processor 1120 may start to count the wait time in sequence or in parallel with the wake-up. In various embodiments, the activation wait time may include a specific time which is set for recognition of a follow-up command after the wake-up, or after a task is performed following the wake-up.

In operation 1115, the user may utter a command related to the voice recognition service to be performed, in response to the wake-up of the electronic device 400. According to various embodiments, the electronic device 400 may receive an audio (e.g., voice information) input corresponding to user's utterance through the microphone 1140 during the activation wait time.

In operation 1117, the microphone 1140 may transfer the received voice information to the follow-up command recognizing unit 1130.

In operation 1119, the follow-up command recognizing unit 1130 may perform voice recognition on the basis of the voice information received through the microphone 1140. According to various embodiments, a voice recognition technique may include a technique in which the electronic device 400 converts an acoustic speech signal (e.g., voice information) obtained through a sound sensor such as a microphone into a word or a sentence. According to an embodiment, the follow-up command recognizing unit 1130 may record the user's utterance and convert it into a sentence (or a word). According to an embodiment, the follow-up command recognizing unit 1130 may perform a task of removing a noise after extracting voice information (e.g., a voice (acoustic) signal), and thereafter may perform voice recognition in such a manner that a feature of the voice signal is extracted and compared with a voice model Data-Base (DB). For example, the voice recognition may recognize user's intention by combining a sensing technique and a data analysis technique.

In operation 1121, the follow-up command recognizing unit 1130 may transfer a recognition result (e.g., recognition information) to the second processor 1120.

In operation 1123, the second processor 1120 may process a related command on the basis of a result of voice recognition of the follow-up command recognizing unit 1130. According to an embodiment, the second processor 1120 may provide the user with the voice recognition service related to execution of a function of a corresponding domain, in response to the recognition information. For example, the second processor 1120 may process a task corresponding to the recognition information.

According to various embodiments, although not shown in FIG. 11, the second processor 1120 may check the activation wait time again in sequence or in parallel at a time of processing a command. For example, the second processor 1120 may initialize the activation wait time count. According to an embodiment, the second processor 1120 may re-start a wait time count from the beginning at a time of completing command processing (e.g., a task). According to various embodiments, the second processor 1120 may equally set a wait time value or may set the value by changing to another value, when the activation wait time is initialized.

In operation 1125, the user may utter a command related to the voice recognition service to be consecutively performed (e.g., an additional follow-up command in which a wake-up word is omitted). According to various embodiments, the electronic device 400 may receive an audio input corresponding to user's utterance through the microphone 1140 during the activation wait time.

In operation 1127, the microphone 1140 may transfer the received voice information to the follow-up command recognizing unit 1130.

In operation 1129, the follow-up command recognizing unit 1130 may perform voice recognition on the basis of the voice information received through the microphone 1140.

In operation 1131, the follow-up command recognizing unit 1130 may transfer a recognition result (e.g., recognition information) to the second processor 1120.

In operation 1133, the second processor 1120 may process a related command on the basis of a result of voice recognition of the follow-up command recognizing unit 1130. According to an embodiment, the second processor 1120 may process a task in association with a previous task or process a task different from the previous task, in response to the recognition information. According to various embodiments, the second processor 1120 may process a task in a functional unit, domain unit, or on the basis of domain switching, for an additional follow-up command in which the wake-up word is omitted as described above.

According to various embodiments, although not shown in FIG. 11, the second processor 1120 may re-start a wait time count from the beginning at a time of completing command processing (e.g., a task). According to various embodiments, the second processor 1120 may equally set a wait time value or may set the value by changing to another value, when the activation wait time is initialized.

In operation 1135, the second processor 1120 may detect an end (expiry) of the activation wait time. According to an embodiment, when the activation wait time is set to 1 minute depending on task processing based on the additional follow-up command, the second processor 1120 may determine a timeout if user's utterance is not detected for 1 minute of the wait time.

In operation 1137, the second processor 1120 may process the wake-up transition of the first processor 1110, on the basis of detecting the end of the activation wait time. According to an embodiment, the second processor 1120 may transfer a wake-up signal to the first processor 1110.

In operation 1139, the first processor 1110 may wake up. According to various embodiments, the first processor 1110 may wake up in response to the wake-up signal of the second processor 1120 in a sleep state.

According to various embodiments, when the first processor 1110 maintains an always-on state, operations 1137 and 1139 related to a wake-up operation of the first processor 1110 may not be performed but be skipped.

In operation 1141, the second processor 1120 may control a related operation so that the follow-up command recognizing unit 1130 and the microphone 1140 transition to the sleep state on the basis of detecting the end of the activation wait time. According to an embodiment, the second processor 1120 may transfer a sleep state transition signal to each of the follow-up command recognizing unit 1130 and the microphone 1140. According to various embodiments, an off state of the microphone 1140 may include a functionally turn-on state, and the sleep state transition of the microphone 1140 may include a functionally turn-off state.

In operations 1143 and 1145, each of the follow-up command recognizing unit 1130 and the microphone 1140 may transition to the sleep state.

In operation 1147, the second processor 1120 may transition to the sleep state in sequence or in parallel with the sleep state transition of the follow-up command recognizing unit 1130 and the microphone 1140.

According to various embodiments, the electronic device 400 may wait for the wake-up word on the basis of the first processor 1110 in the sleep state (e.g., the inactive state of the voice recognition service) of the second processor 1120, follow-up command recognizing unit 1130, microphone 1140, or the like, and may not perform a voice recognition operation for user's utterance by means of the second processor 1120, the follow-up command recognizing unit 1130, the microphone 1140, or the like.

Figure 12:
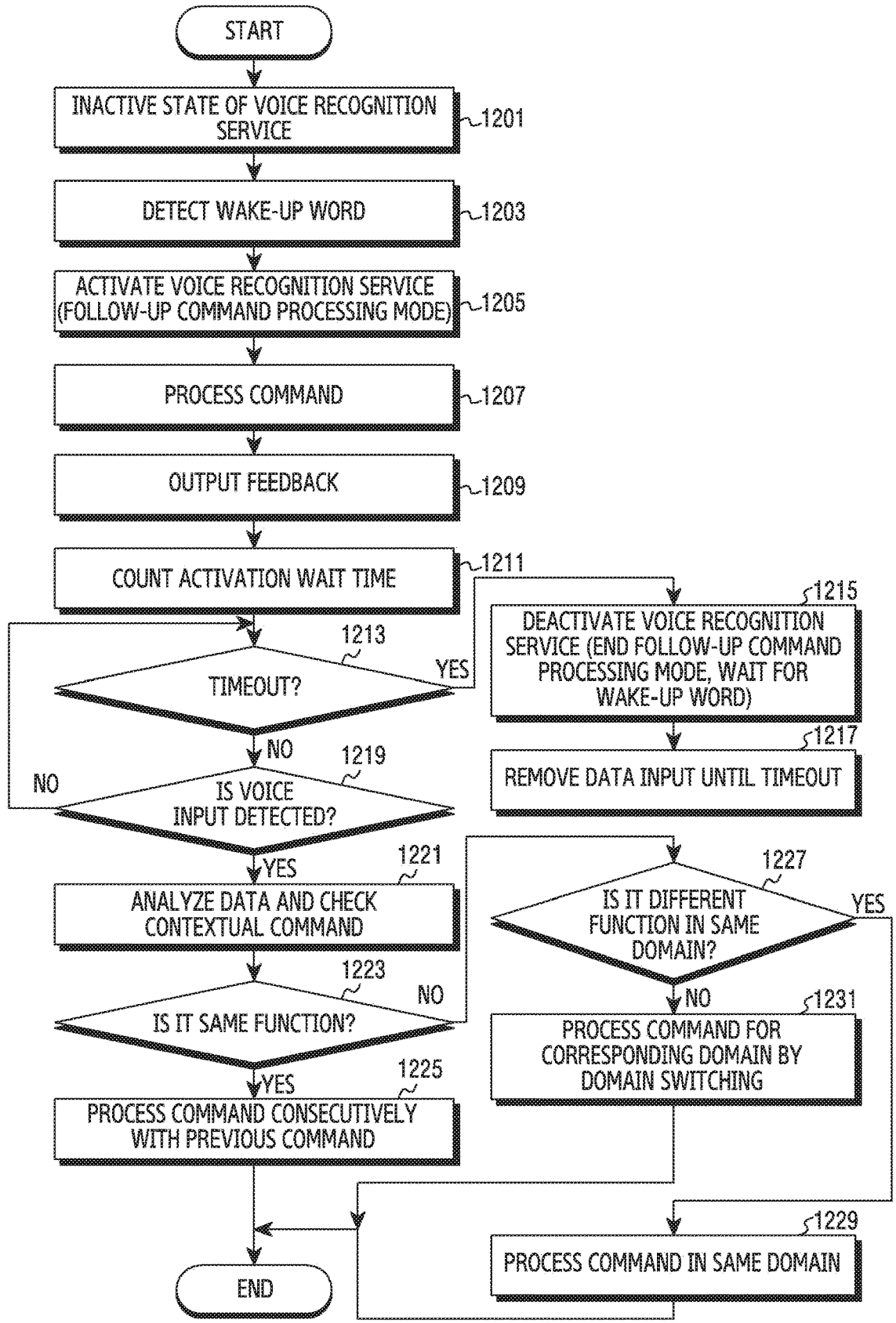
FIG. 12 is a flowchart illustrating an operation of providing a voice recognition service in an electronic device according to various embodiments of the disclosure.

FIG. 12 is a flowchart illustrating an operation of providing a voice recognition service in an electronic device according to various embodiments of the disclosure.

Referring to FIG. 12, in operation 1201, the electronic device 400 may be in an in active state of a voice recognition service, and may be in a state of waiting for an input of a wake-up word.

In operation 1203, the processor 480 of the electronic device 400 may detect the wake-up word. According to an embodiment, the electronic device 400 may recognize the wake-up word through a microphone (or a sound sensor), on the basis of a first processor (e.g., a wake-up processing unit, a wake-up engine) for recognizing the wake-up word.

In operation 1205, the processor 480 may activate a voice recognition service in response to the wake-up word detection. According to an embodiment, the electronic device 400 may wake up the second processor (e.g., a follow-up command recognizing unit, a voice recognition engine (e.g., ASR), a microphone, a service control circuit, etc.), on the basis of the wake-up word detection of the first processor. According to various embodiments, the processor 480 may enter a follow-up command processing mode (e.g., an active state of a voice recognition service) capable of detecting a voice command in which a trigger for wake-up (e.g., a wake-up word) is omitted during a wait time, in response to the wake-up. According to various embodiments, the processor 480 may perform voice recognition for the voice command based on user's utterance without reception of the trigger in the follow-up command processing mode.

In operation 1207, the processor 480 may process a related command (e.g., a task) on the basis of the voice recognition result. According to an embodiment, after the wake-up, the processor 480 may recognize first voice information based on the user's utterance, and may process at least one first task related to execution of a function corresponding to the first voice information.

In operation 1209, the processor 480 may control a feedback output. According to various embodiments, the processor 480 may provide a user with a feedback indicating that the voice recognition service is in an active state in various manners. According to various embodiments, the processor 480 may provide the user with the feedback at least in part based on visual, auditory, or tactile senses, depending on a configuration scheme. According to various embodiments, the feedback may be provided during the voice recognition service is active, and a feedback output may end upon occurrence of a timeout. Various feedback providing methods according to various embodiments will be described in detail with reference to the accompanying drawings.

In operation 1211, the processor 480 may count an activation wait time. According to various embodiments, the processor 480 may start to count the wait time in sequence or in parallel with first task processing. In various embodiments, the activation wait time may include a specific time which is set for recognition of a follow-up command after the wake-up, or after a task is performed following the wake-up. According to various embodiments, the activation wait time may be pre-defined based on timing at which additional user's utterance mostly occurs or may be adaptively defined.

In various embodiments, operations prior or next to operation 1209 and operation 1211 are provided for convenience of explanation, and are not limited to the order of FIG. 12. For example, operation 1209 and operation 1211 may be performed in a sequential, parallel, or reverse sequential manner.

In operation 1213, the processor 480 may determine whether a timeout occurs in response to the count of the activation wait time. For example, the processor 480 may determine whether a time (e.g., N seconds (minutes)) which is set to the activation wait time elapses.

Upon determining that the timeout occurs in operation 1213 (i.e., Yes in operation 1213), the processor 480 may deactivate a voice recognition service in operation 1215. According to an embodiment, the electronic device 400 may maintain the active state of the first processor, and may deactivate the second processor. According to various embodiments, the processor 480 may end the follow-up command processing mode, and may wait for the wake-up word detection performed by the first processor.

In operation 1217, the processor 480 may remove (delete) data which is input until the timeout. According to various embodiments, the processor 480 may delete an audio file recorded for voice recognition in the follow-up command processing mode. In various embodiments, the deletion of the recorded audio file may be performed for privacy protection, an increase in memory management efficiency, or the like.

Upon determining that the timeout does not occur in operation 1213 (i.e., No in operation 1213), the processor 480 may determine whether a voice input is detected in operation 1219. According to an embodiment, the processor 480 may receive new voice information (e.g., second voice information) which is input based on user's utterance without an additional wake-up word during an active state of the voice recognition service.

Upon determining that the voice input is not detected in operation 1219 (i.e., No in operation 1219), proceeding to operation 1213, the processor 480 may perform operation 1213 and its subsequent operations.

Upon determining that the voice input is detected in operation 1219 (i.e., Yes in operation 1219), the processor 480 may analyze data and check for a contextual command in operation 1221. According to an embodiment, the processor 480 may compare and analyze a context of first voice information (e.g., previous dialog context) and a context of second voice information (e.g., additional dialog context). According to an embodiment, the processor 480 may record user's utterance and convert it into a sentence (or a word), and may determine whether a pre-set domain list (e.g., a contextual command for each domain) has a sentence corresponding to the converted sentence.

In operation 1223, the processor 480 may determine whether the command corresponds to the same function as a function of a previously processed command (or task). For example, the processor 480 may determine whether it is a follow-up command based on the same function in the same domain, for example, whether it is a follow-up command corresponding to a functional unit.

Upon determining that the voice input is the command corresponding to the same function in operation 1223 (i.e., Yes in operation 1223), the processor 480 may process a corresponding command in association with a function performed depending on a previous command in operation 1225. According to an embodiment, if it is exemplified that the previous command is a control for increasing/decreasing a function "Volume" in a domain "Music", the processor 480 may consecutively perform the control for increasing/decreasing the function "Volume" in the domain "Music".

Upon determining that the voice input is not the command corresponding to the same function in operation 1223 (i.e., No in operation 1223), the processor 480 may determine whether the command corresponds to a different function in the same domain of the previously processed command (or task) in operation 1227. For example, the processor 480 may determine whether the command is a follow-up command based on the different function in the same function, for example, whether the command is a follow-up command corresponding to a domain unit.

Upon determining that the voice input is the command corresponding to the different function in the same domain in operation 1227 (i.e., Yes in operation 1227), the processor 480 may process a corresponding command in the same domain in operation 1229. According to an embodiment, if it is exemplified that the command is a control for increasing/decreasing the function "Volume" in the domain "Music", the processor 480 may perform a control of a function related to a domain "Play control" in the domain "Music".

Upon determining that the voice input is not the command corresponding to the different function in the same domain in operation 1227 (i.e., No in operation 1227), for example, if it is determined that the command corresponds to a function of a different domain, the processor 480 may process a command corresponding to the domain through domain switching in operation 1231. According to an embodiment, the domain "Music" may transition to a domain "Schedule", and a control of a related function may be performed in the domain "Schedule".

Figure 13:
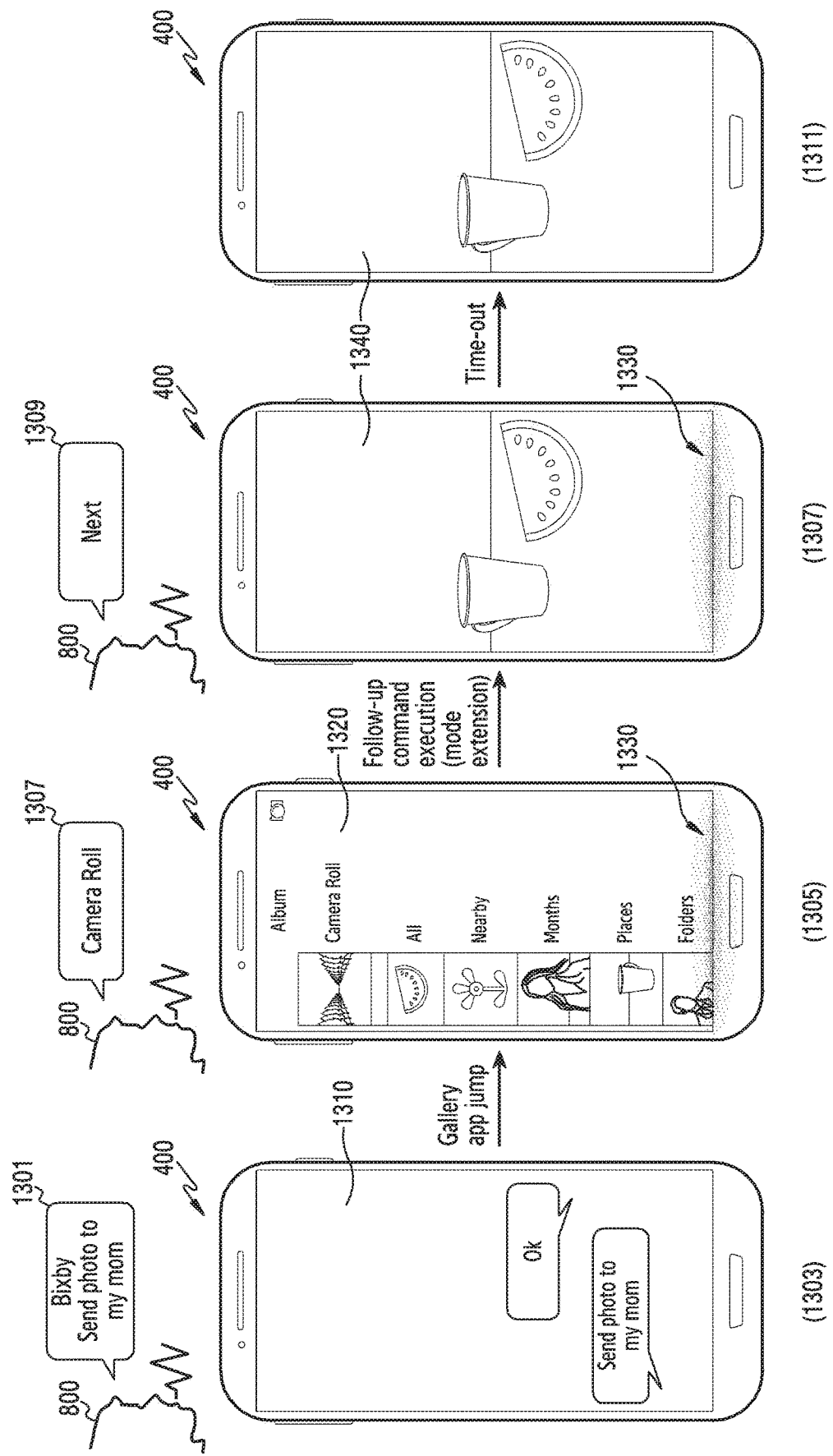
FIG. 13 is a drawing for explaining an example of providing a feedback for an active state of a voice recognition service in an electronic device according to various embodiments of the disclosure.

FIG. 13 is a drawing for explaining an example of providing a feedback for an active state of a voice recognition service in an electronic device according to various embodiments of the disclosure.

As shown in FIG. 13, the example of FIG. 13 shows a case where the electronic device 400 is a mobile phone (or a smart phone). In FIG. 13, it is exemplified that a wake-up word of the electronic device 400 is set to "Bixby". According to various embodiments, the electronic device 400 may include a microphone (or a sound sensor), and may receive an audio input based on user's utterance through the microphone.

Referring to FIG. 13, in operation 1301, the user 800 may utter a wake-up word (e.g., Bixby) configured in the electronic device 400 so that a voice recognition service is initiated by the electronic device 400. According to an embodiment, the user 800 may utter the wake-up word and a command (e.g., a command related to execution of a task (function) based on the voice recognition service) (e.g., Send photo to my mom). For example, an example of a case where the user 800 utters the wake-up word and the command together may be shown in the embodiment of FIG. 13. According to an embodiment, in operation 1301, the user 800 may utter, for example, "Bixby, Send photo to my mom" to execute the wake-up function of the electronic device 400. Herein, "Bixby" may correspond to the wake-up word, and "Send photo to my mom" may correspond to the command.

According to various embodiments, the electronic device 400 may receive an audio input based on the utterance of the user 800 through a microphone. According to various embodiments, in operation 1303, the electronic device 400 may wake up in response to the wake-up word (e.g., Bixby) of the user 800.

According to various embodiments, the electronic device 400 may perform voice recognition for a command (e.g., Send photo to my mom) of the user 800 on the basis of the wake-up. The electronic device 400 may perform a related task on the basis of a recognition result. According to an embodiment, in operation 1305, the electronic device 400 may execute a gallery application, and may display a screen 1320 of a photo list.

According to various embodiments, the electronic device 400 may provide a voice User Interface (UI) 1310 on the basis of the wake-up. According to an embodiment, as exemplified in operation 1303, the electronic device 400 may provide a result for voice recognition to the user 800, by displaying a command (e.g., Send photo to my mom) of the user 800 on the basis of voice recognition. According to an embodiment, the electronic device 400 may recognize the command of the user 800, and may provide the user 800 with a response (or a feedback) (e.g., OK) to report that the command will be executed.

According to various embodiments, the electronic device 400 may provide the user 800 with the response by executing a command corresponding to voice recognition (e.g., by executing a function of a corresponding domain) in the same state as operation 1303. According to an embodiment, the electronic device 400 may provide the screen 1320 of the photo list by executing the gallery application as in operation 1305. According to various embodiments, the electronic device 400 may be configured such that the voice UI 1310 does not completely end but operate in background to recognize a follow-up command, even after jumping to a specific application (e.g., the gallery application) to process the command.

According to various embodiments, the electronic device 400 may provide a feedback indicating an active state of the voice recognition service (e.g., the follow-up command processing mode) to the user 800 in sequence or in parallel with the wake-up or the processing of a command based on the wake-up. According to an embodiment, in operation 1305, the electronic device 400 may provide the user 800 with the active state of the voice recognition service through LED light emitting 1330. The user 800 may recognize that a follow-up command can be executed on the basis of the LED light emitting 1330 of the electronic device 400.

According to various embodiments, the electronic device 400 may provide visual (e.g., You can command the letters shown on the screen) or a UL component number (e.g., a counter number) on the basis of a popup window or a specific region of a display or may provide an Auditory Cue (e.g., TTS announcement such as "You can say"), in order to provide which command can be executed by the user 800 on a moved screen. According to various embodiments, a feedback output may be maintained during a wait time which is set in the follow-up command processing mode, and may be extended in response to utterance detection of the user 800 during the follow-up command processing mode.

In operation 1307, the user 800 may utter an additional command during the follow-up command can be executed, for example, during a wait time which is set during the voice recognition service is active. According to an embodiment, in operation 1307, the user 800 may utter "Camera Roll" to select a specific photo (e.g., Camera Roll) in a photo list.

According to various embodiments, the electronic device 400 may extend the wait time depending on the follow-up command processing mode, upon detecting an additional utterance of the user 800 in the follow-up command processing mode. According to an embodiment, the electronic device 400 may initialize the set wait time to count again from the beginning, or may increase (extend) the wait time by adding an additional time to the wait time which is being counted.

According to various embodiments, in the same state as operation 1305, the electronic device 400 may execute a command which is subjected to voice recognition by being input during the follow-up command processing mode and may provide it to the user 800. According to an embodiment, in operation 1307, the electronic device 400 may display a screen 1340 (e.g., a full screen of a photo) by executing a photo of "Camera Roll". According to various embodiments, the feedback output (e.g., LED light emitting 1330) may be consecutively output during a set or changed wait time.

According to various embodiments, the electronic device 400 may stop the feedback output upon determining a timeout of the wait time. According to an embodiment, as exemplified in operation 1311, the electronic device 400 may stop the feedback based on the LED light emitting 1330 by turning the LED off. In various embodiments, upon occurrence of a timeout of the wait time, the electronic device 400 may end the follow-up command processing mode and may deactivate a voice UI.

In various embodiments, upon occurrence of a timeout of the wait time, the electronic device 400 may not perform voice recognition for the utterance of the user 800. According to an embodiment, as exemplified in operation 1309, when the user 800 utters an additional command (e.g., Next) when a follow-up command cannot be executed, for example, after a wait time which is set for activation of the voice recognition service is time out. According to various embodiments, since voice recognition is not performed, the electronic device 400 cannot recognize the utterance of the user 800, and as exemplified in operation 1311, may maintain an execution state of operation 1307. For example, the electronic device 400 may maintain a display state of the screen 1340 of the photo "Camera Roll", without an action for the utterance (e.g., Next) of the user 800.

Figure 14:
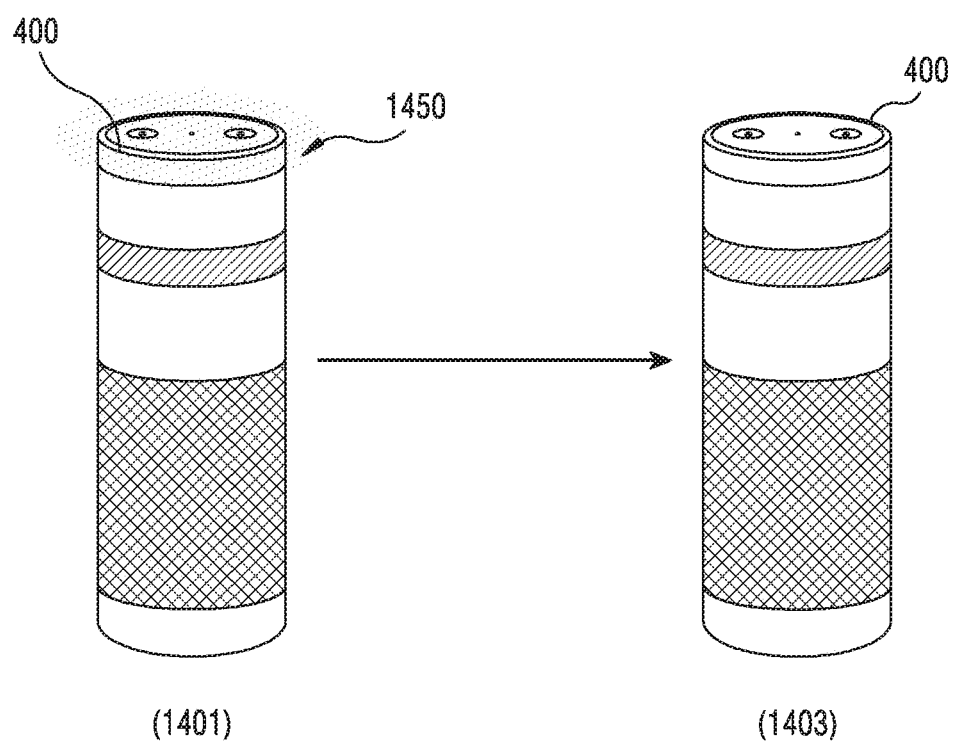
FIG. 14 and FIG. 15 are a drawing for explaining another example of providing a feedback for an active state of a voice recognition service in an electronic device according to various embodiments of the disclosure.
Figure 15:
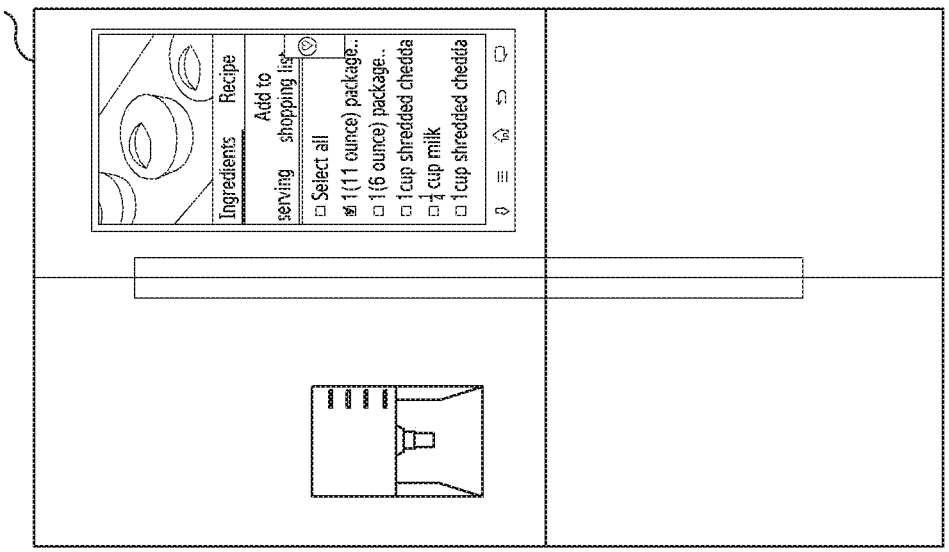
Figure 15:
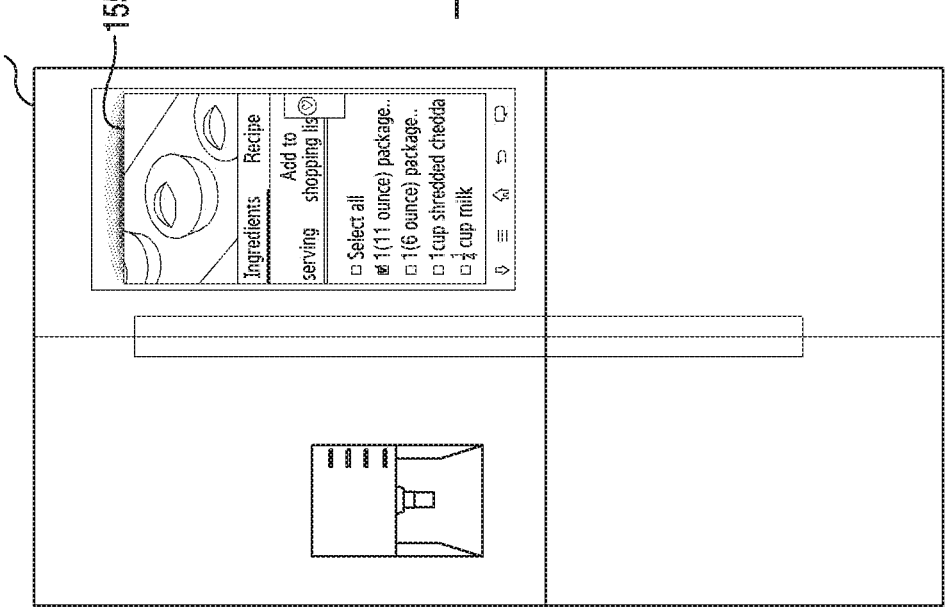

FIG. 14 and FIG. 15 are drawings for explaining another example of providing a feedback for an active state of a voice recognition service in an electronic device according to various embodiments of the disclosure.

As shown in FIG. 14 and FIG. 15, the example of FIG. 14 shows an exemplary case where the electronic device 400 is a speaker (e.g., a Bluetooth speaker), and the example of FIG. 15 shows an exemplary case where the electronic device 400 is a refrigerator.

Referring to FIG. 14, in various embodiments, the electronic device 400 may provide an active state of a voice recognition service to a user by using an LED light 1450. According to an embodiment, in operation 1401, the electronic device 400 may provide a user with a feedback indicating that an additional command is possible, after performing a task (e.g., a user's command) through light emitting of the LED or specific color of the LED during the voice recognition service is active.

In operation 1403, the electronic device 400 may deactivate the voice recognition service and stop a feedback output, upon determining a timeout of a wait time of the voice recognition service. According to an embodiment, the electronic device 400 may determine the timeout and may turn the LED off, if an audio input depending on a user's utterance is not detected during a set wait time.

Referring to FIG. 15, in various embodiments, the electronic device 400 may provide the user with an active state of the voice recognition service by using a specific graphic element (e.g., GUI). According to an embodiment, in operation 1501, a specific GUI 1550 may be provided on a specific region of a display, or on the basis of a popup window or the like. For example, the electronic device 400 may display the specific GUI such as "You can give an additional command", "the number for counting the wait time", "You can say", or the like during the voice recognition service is active and may perform a task (e.g., a user's command) and thereafter provide the user with a feedback indicating that an additional command is possible.

In operation 1503, the electronic device 400 may deactivate the voice recognition service and stop a feedback output, upon determining a timeout of a wait time of the voice recognition service. According to an embodiment, the electronic device 400 may determine the timeout and may not display the specific GUI displayed on the display, if an audio input depending on a user's utterance is not detected during a set wait time. For example, the electronic device 400 may remove the specific GUI displayed on a specific region of the display, or may remove a popup window.

Figure 16A:
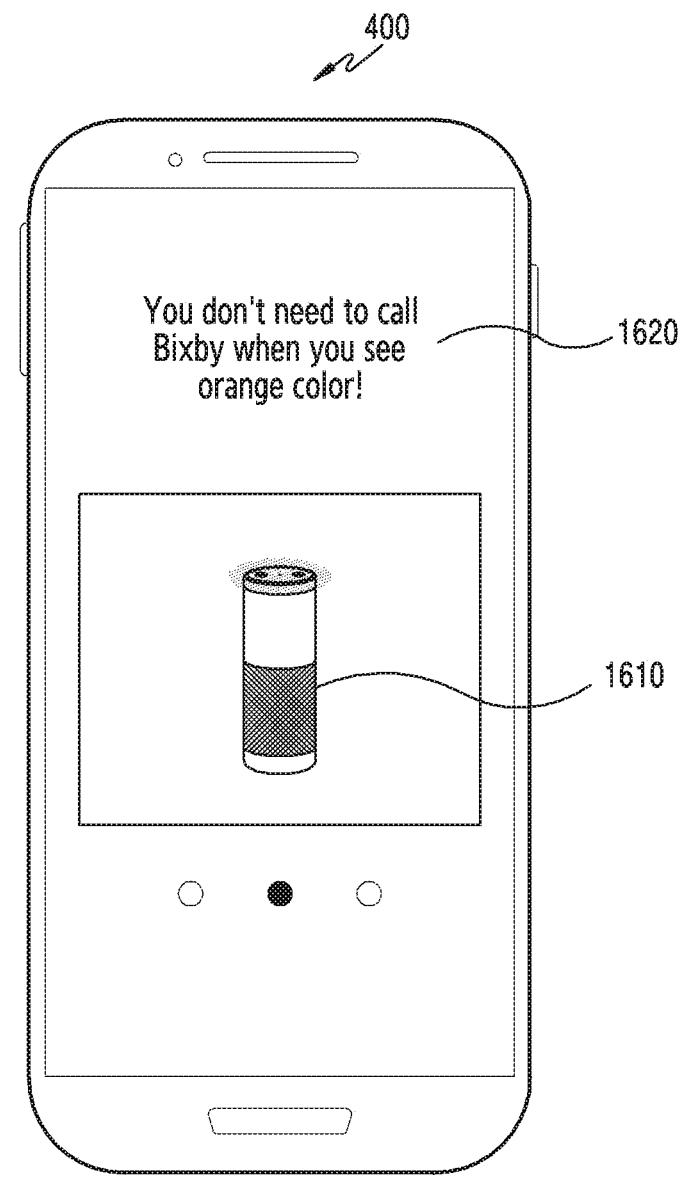
FIG. 16A and FIG. 16B are a drawing for explaining an example of a guide for a method of performing a voice recognition service in an electronic device according to various embodiments of the disclosure.
Figure 16B:
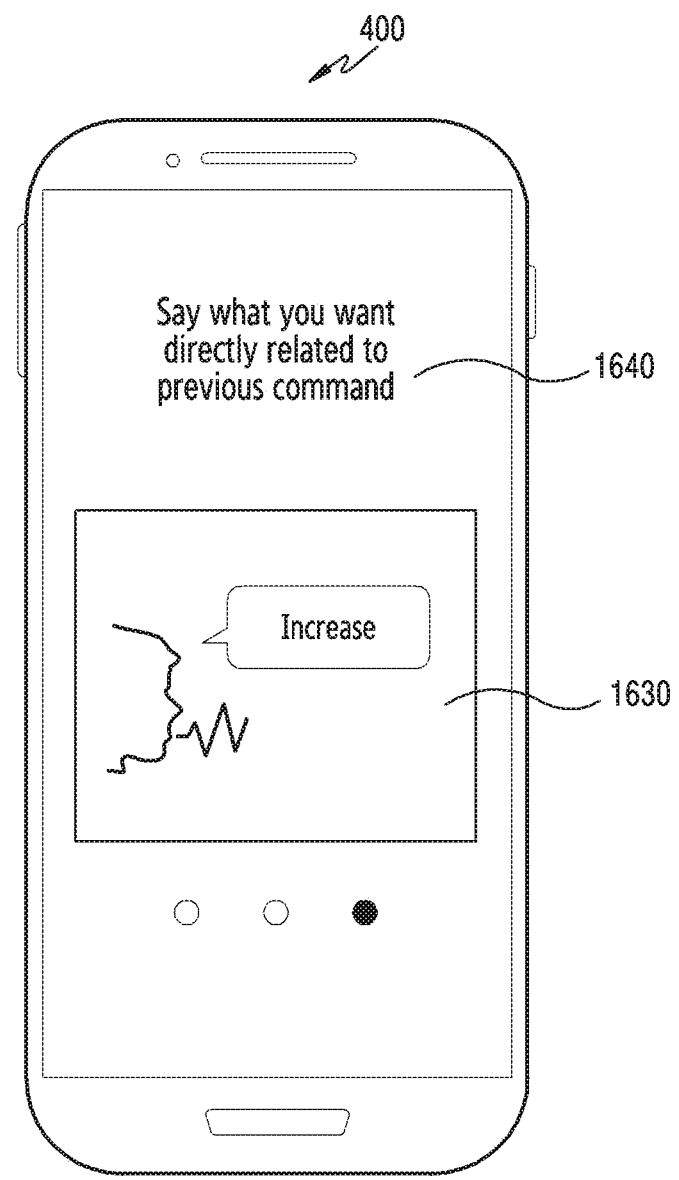

FIG. 16A and FIG. 16B are drawings for explaining an example of a guide for a method of performing a voice recognition service in an electronic device according to various embodiments of the disclosure.

As shown in FIG. 16A and FIB. 16B, FIG. 16A and FIG. 16B may show an example of providing a user's guide on the basis of Out Of Box Experience (OOBE). According to various embodiments, the electronic device 400 may provide various guides for a method of using a voice recognition service. For example, FIG. 16A and FIG. 16B may show an exemplary guide which provides a guide interface in a graphic manner through a display of the electronic device 400.

According to various embodiments, the guide may be provided in a tutorial manner. For example, it may be provided such that the electronic device 400 proposes an example and the user performs an operation according to the proposed example to understand a function and a method.

According to an embodiment, as shown in FIG. 16A, the electronic device 400 may provide a guide image 1610 and a guide text 1620 to guide an active state of the voice recognition service. Referring to FIG. 16A, the electronic device 400 may display an image (or an icon) of the electronic device 400 and a means (or an object) (e.g., LED light emitting) indicating that the voice recognition service is in an activate state. In addition, the electronic device 400 may provide a text (e.g., You don't need to call Bixby when you see orange color!) to guide a user's act in the active state of the voice recognition service.

According to an embodiment, as shown in FIG. 16B, the electronic device 400 may provide a guide image 1630 and a guide text 1640 to guide how to input (utter) an additional command by the user in the activate state of the voice recognition service. Referring to FIG. 16B, the electronic device 400 may display an image indicating an example of user's utterance. In addition, the electronic device 400 may provide a text (e.g., Say what you want directly related to previous command) to guide a user's utterance method.

Figure 17:
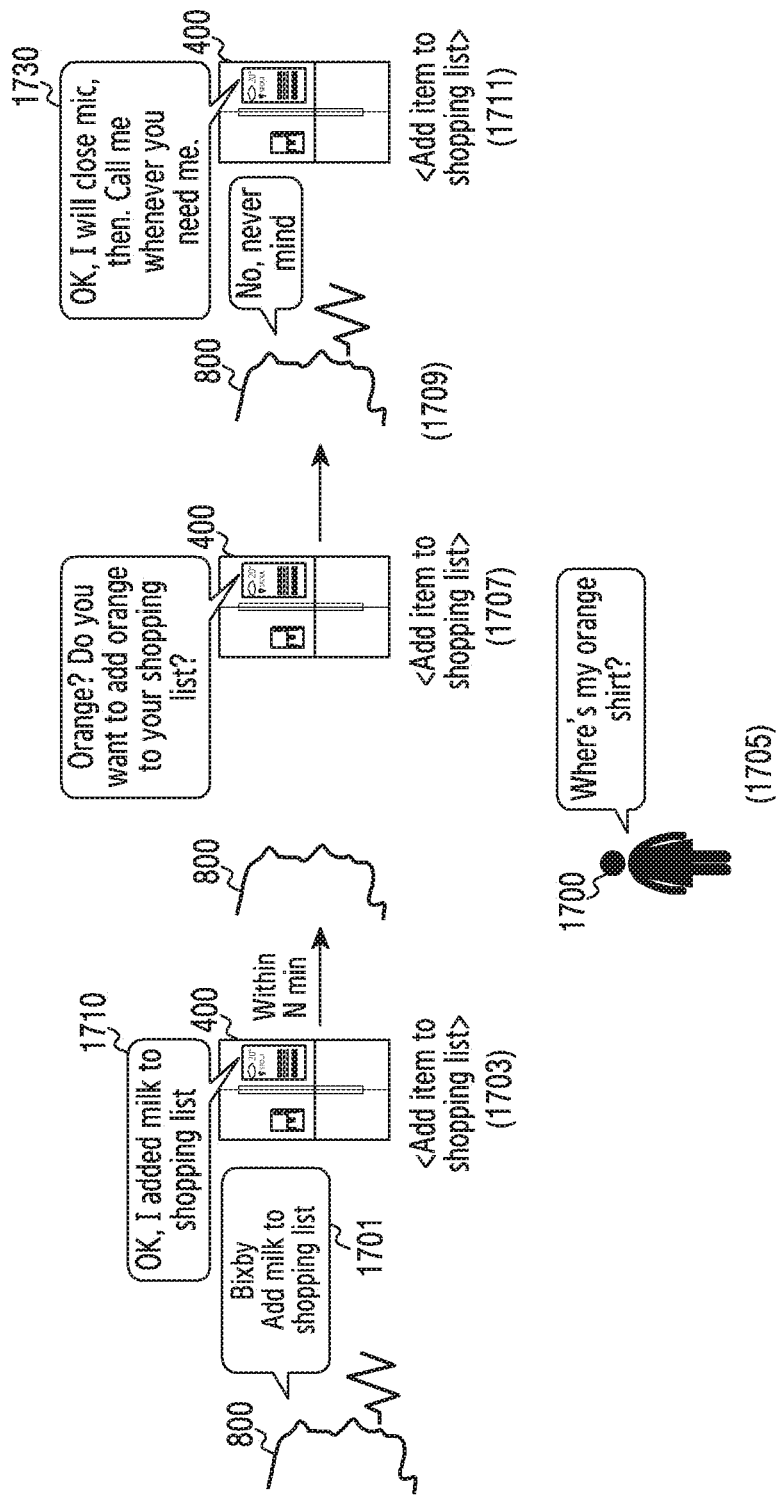
FIG. 17 is a drawing for explaining an example of avoiding a malfunction of a voice recognition service in an electronic device according to various embodiments of the disclosure.

FIG. 17 is a drawing for explaining an example of avoiding a malfunction of a voice recognition service in an electronic device according to various embodiments of the disclosure.

As shown in FIG. 17, the example of FIG. 17 is an exemplary case where the electronic device 400 is a refrigerator. In FIG. 17, it is exemplified that a wake-up word of the electronic device 400 is set to "Bixby". In various embodiments, the electronic device 400 may include a microphone (or a sound sensor) and a speaker. The electronic device 400 may receive an audio input based on user's utterance through the microphone, and may process an audio output generated by the electronic device 400 through the speaker.

According to various embodiments, the electronic device 400 may be configured to operate through user's confirmation before performing a task, in order to avoid a malfunction of the voice recognition service through conversations among users, a user's soliloquy, or audio of other electronic devices (e.g., TV or radio broadcasting).

Referring to FIG. 17, in operation 1701, the user 800 may utter a command (e.g., a wake-up word+a command) for wake-up and task (or function) execution in the electronic device 400, in order to initiate a voice recognition service (e.g., shopping list creation (management) control) by means of the electronic device 400. According to an embodiment, the user 800 may utter such as "Bixby, Add milk to shopping list". Herein, "Bixby" may correspond to the wake-up word, and "Add milk to shopping list" may correspond to the command. According to various embodiments, the electronic device 400 may wake up in response to the wake-up word (e.g., Bixby) of the user 800.

According to various embodiments, the electronic device 400 may recognize a command (e.g., Add milk to shopping list) of the user 800 on the basis of the wake-up. According to an embodiment, in operation 1703, the electronic device 400 may add a corresponding item (e.g., milk) to a shopping list in response to the command "Add milk to shopping list". According to various embodiments, the electronic device 400 may provide the user 800 with a feedback for execution of the task, as exemplified in operation 1710. In various embodiments, the feedback for execution of the task may be provided at least in part based on a visual output, auditory output, or tactile output according to a type of the electronic device 400. According to an embodiment, as illustrated in operation 1710, the electronic device 400 may provide a feedback corresponding to interaction with the user 800, such as "OK, I added milk to shopping list".

According to various embodiments, the electronic device 400 may wait for a pre-set wait time (e.g., N seconds) during which an active state of the voice recognition service is maintained. According to various embodiments, the electronic device 400 may receive an audio input by means of the user 800, a different user 1700, or a different electronic device (not shown). According to an embodiment, an unintended audio not related to a task to be performed by the user 800 may be input. For example, an audio including a contextual command related to "Add item to shopping list" may be input by the different user 1700.

According to an embodiment, in operation 1705, the different user 1700 may utter, for example, "Where's my orange shirt?", without the wake-up word (e.g., Bixby), during the wait time (e.g., N seconds) of the electronic device 400.

In operation 1707, the electronic device 400 may recognize an audio input based on the utterance of the different user 1700 as a follow-up command, and may provide a feedback for confirmation of the user 800 before executing a corresponding task on the basis of a recognition result.

According to an embodiment, the electronic device 400 may detect "orange" as the contextual command during the task of "Adding item to shopping list", and thus may determine that the task is performed consecutively. However, since "orange" may not be uttered by the user 800 and may not be the item to be added to the shopping list, a malfunction may occur. To prevent this, in various embodiments, the electronic device 400 may provide a feedback to confirm whether it is a task intended by the user 800.

According to an embodiment, the electronic device 400 may recognize "orange shirt" on the basis of context analysis, even if "orange" is included as the contextual command.

In this case, the electronic device 400 may determine this as an incorrect command, and may provide a feedback for inducing the confirmation of the user 800. According to various embodiments, the feedback for receiving the confirmation of the user 800 may be configured to be performed when determining a context included in the contextual command during a wait time of a voice recognition service, or to be performed in response to all audio inputs irrespective of the contextual command.

Referring to the example of operation 1720, the electronic device 400 may provide a feedback for interaction with the user 800, such as "Orange? Do you want to add orange to your shopping list?", in order to confirm the user 800.

In operation 1709, the user 800 may utter a response in response to the feedback (e.g., "Orange? Do you want to add orange to your shopping list?") of the electronic device 400. According to an embodiment, in operation 1709, the user 800 may utter such as "No, never mind".

In operation 1711, the electronic device 400 may recognize a response command (e.g., No, never mind) of the user 800 in response to a confirmation request of the user 800, and may perform a corresponding task on the basis of a recognition result.

According to an embodiment, upon determining that the response command is a positive acknowledge (e.g., OK, Sure, Add, Yes, etc.), the electronic device 400 may determine that it is a task (e.g., Add item to shopping list) associated with a previous task, and may add a corresponding item (e.g., Orange) to the shopping list.

According to an embodiment, upon determining that the response command is a negative acknowledge (e.g., No), the electronic device 400 may stop the execution of the task on the basis of a recognition result. According to an embodiment, as exemplified in operation 1730, the electronic device 400 may inform the user 800 of the end of the voice recognition service such as "OK, I will close mic, then. Call me whenever you need me.", and thereafter may provide an ending feedback to inform of calling based on the wake-up word. According to various embodiments, after providing the ending feedback, the electronic device 400 may deactivate the voice recognition service, and may transition to a state of waiting for the wake-up word.

According to various embodiments, although not shown, the electronic device 400 may further perform an operation of confirming again whether to continue or end a task in response to the negative acknowledge of the user 800. According to various embodiments, upon detecting the negative acknowledge, the electronic device 400 may operate to deactivate the voice recognition service without an additional ending feedback. According to various embodiments, even if the negative acknowledge is detected, the electronic device 400 may maintain the voice recognition service to be in an active state during a set wait time, and may operate to deactivate the voice recognition service in response to a timeout of the wait time.

Figure 18:
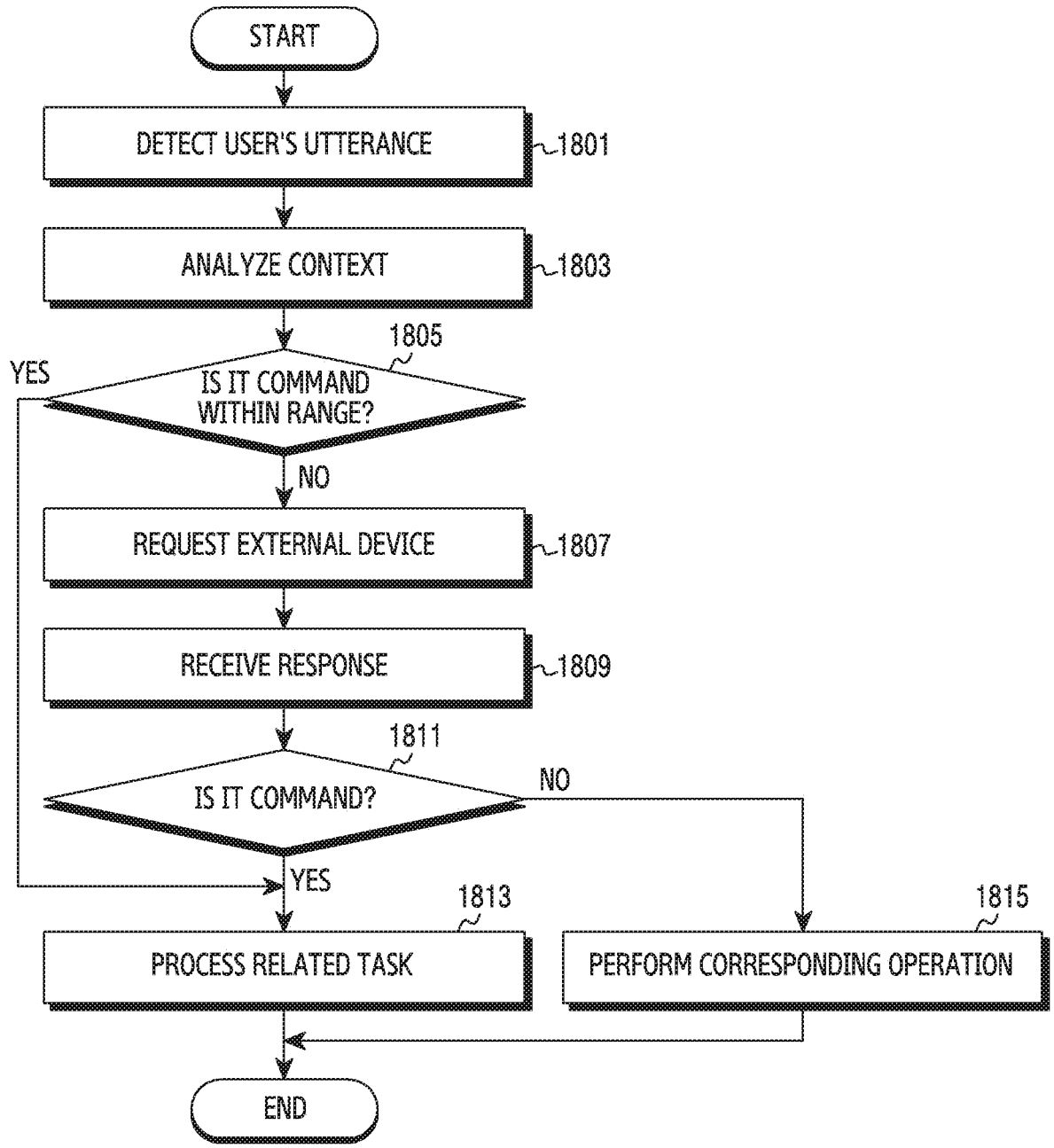
FIG. 18, FIG. 19, and FIG. 20 illustrate a different example in which a voice recognition service is provided in an electronic device according to various embodiments of the disclosure.
Figure 19:
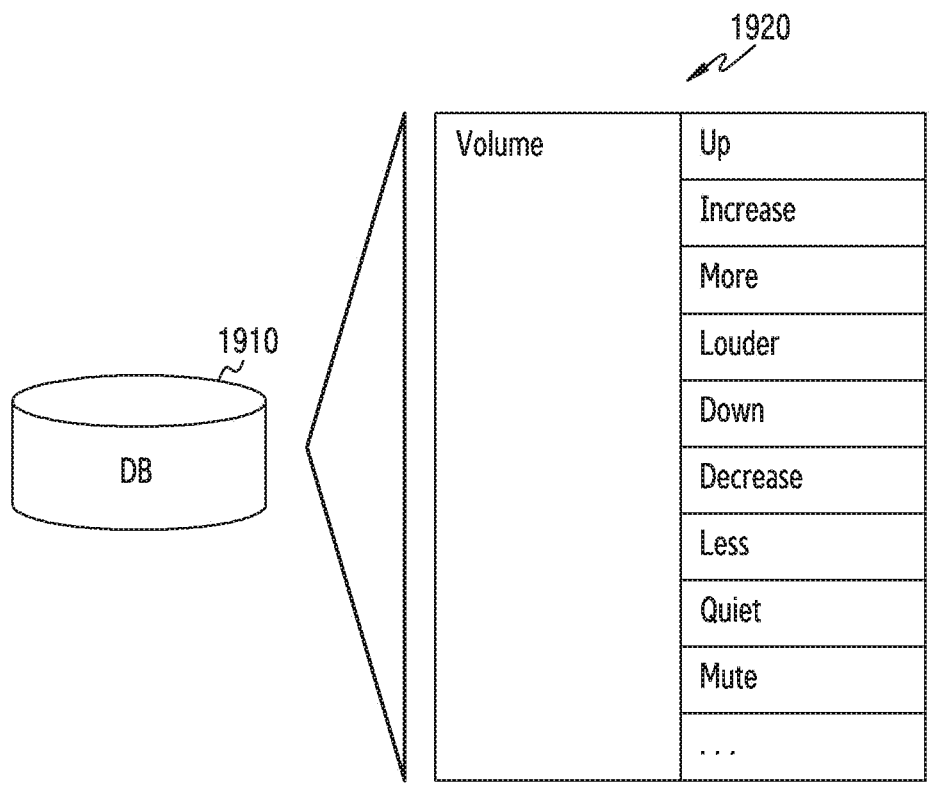
Figure 20:
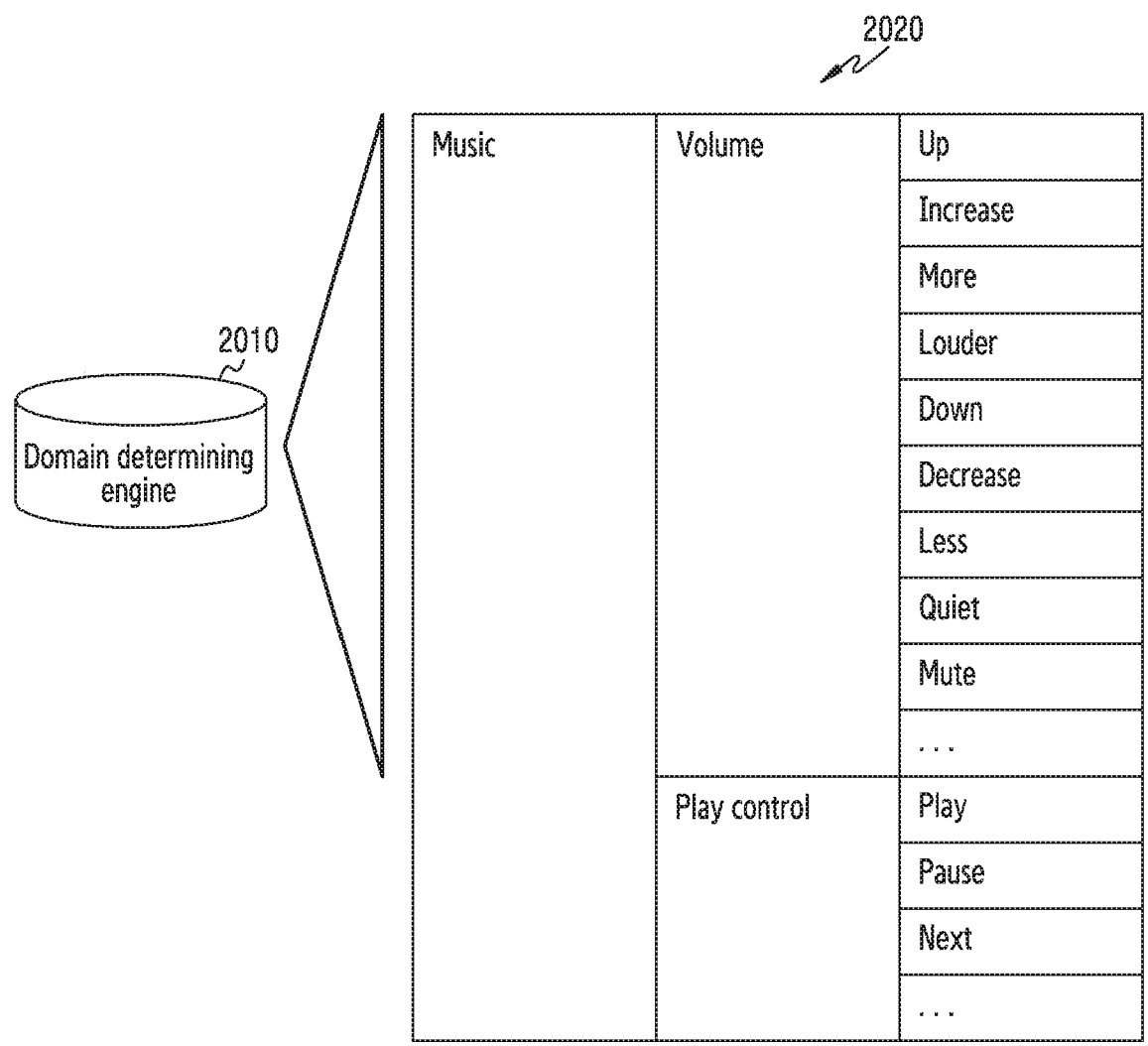

FIG. 18, FIG. 19, and FIG. 20 illustrate different examples in which a voice recognition service is provided in an electronic device according to various embodiments of the disclosure.

As shown in FIG. 18, FIG. 18 illustrates an exemplary operation in a method in which an electronic device provides a voice recognition service in association with an external device (e.g., a server, another electronic device, or an external engine) in various embodiments. According to various embodiments, depending on a range of implementing a contextual command, if it cannot be processed in an embedded chip of the electronic device 400, a command may be determined through a related engine (e.g., a domain determining engine) which exists in a server or a separate chip. In the example of FIG. 18, it is described for example that the external device is the server for convenience of explanation.

Referring to FIG. 18, in operation 1801, the processor 480 of the electronic device 400 may detect user's utterance during a voice recognition service is active. According to various embodiments, the processor 480 may perform voice recognition in response to detection of the user's utterance.

In operation 1803, the processor 480 may analyze a context on the basis of a recognition result. According to an embodiment, the processor 480 may record the user's utterance and convert (e.g., ASR) it into letters (e.g., a sentence, a word), and may determine whether there are letters corresponding to a contextual command which is present in advance among the converted letters. For example, it may be determined whether the context based on the user's utterance is included in a range (e.g., a range of a pre-set contextual command) of a database (e.g., a memory) of the electronic device 400. An example of this is illustrated in FIG. 19.

Referring to FIG. 19, the electronic device 400 may include a pre-determined database 1910 (e.g., a memory). As shown in FIG. 19, the pre-determined database 1910 may include a limited command range 1920 according to a type of the electronic device 400. Therefore, the electronic device 400 may rapidly process a command corresponding to the limited command range 1920.

In operation 1805, the processor 480 may determine whether the command based on the user's utterance is a command within the range on the basis of a result of the analysis. According to an embodiment, the processor 480 may determine whether recognized letters (e.g., a sentence, a word) are letters which exist in the pre-determined database.

Upon determining that it is the command within the range in operation 1805 (i.e., Yes in operation 1805), proceeding to operation 1813, the processor 480 may process the execution of operation 1813 and its subsequent operations. According to an embodiment, if a sentence recognized based on the user's utterance is a sentence which exists in the pre-determined database, the processor 480 may process a related task on the basis of a recognition result.

Upon determining that it is not the command within the range in operation 1805 (i.e., No in operation 1805), the processor 480 may request the external device to analyze a corresponding context in operation 1807. According to an embodiment, if the sentence recognized based on the user's utterance is the sentence which does not exist in the pre-determined database, the processor 480 may transmit a corresponding sentence to the external device and may request for transmission of a recognition result. An example thereof is illustrated in FIG. 20.

Referring to FIG. 20, an external device (e.g., a server) may include a domain determining engine 2010 with greater capacity (or higher performance) than the electronic device 400. As shown in FIG. 20, the external device may include a wider command range 2020 than the electronic device 400. Accordingly, the external device may recognize and process various commands corresponding to user's utterance.

In operation 1809, the processor 480 may receive from the external device a response corresponding to a recognition result based on the external device.

In operation 1811, the processor 480 may determine whether the received response is included in the command range. According to an embodiment, the processor 480 may determine whether the recognition result is a command related to execution of the task, on the basis of the received response.

Upon determining that the received response is included in the command range in operation 1811 (i.e., Yes in operation 1811), the processor 480 may process a related task in operation 1813.

Upon determining that the received response is not included in the command range in operation 1811 (i.e., No in operation 1811), the processor 480 may process the execution of a corresponding operation in operation 1815. According to an embodiment, the processor 480 may wait for user's utterance during a wait time for the voice recognition service, and may deactivate the voice recognition service in response to a timeout.

Figure 21:
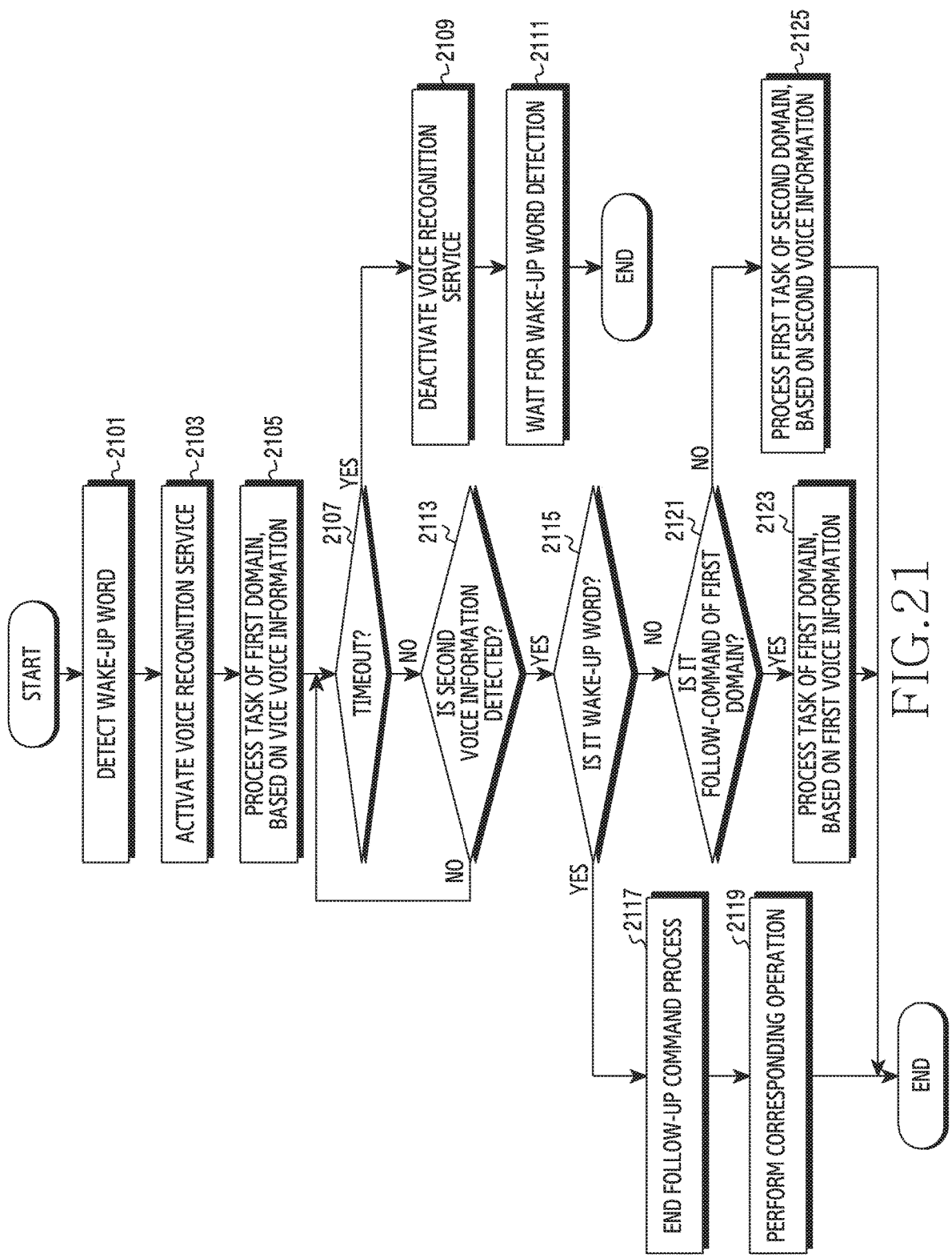
FIG. 21 is a flowchart illustrating an operation of providing a voice recognition service in an electronic device according to various embodiments of the disclosure.

FIG. 21 is a flowchart illustrating an operation of providing a voice recognition service in an electronic device according to various embodiments of the disclosure.

Referring to FIG. 21, in operation 2101, the processor 480 of the electronic device 400 may detect the wake-up word. According to an embodiment, the electronic device 400 may recognize the wake-up word through a microphone, on the basis of a first processor (e.g., a wake-up processing unit, a wake-up engine) for recognizing the wake-up word.

In operation 2103, the processor 480 may activate a voice recognition service. For example, the processor 480 may wake up in response to wake-up word detection. According to an embodiment, the electronic device 400 may wake up a second processor (e.g., a follow-up command recognizing unit, a voice recognition engine, a service control circuit, etc.) on the basis of the wake-up word detection of the first processor (e.g., the wake-up engine). According to various embodiments, the processor 480 may initiate voice recognition based on user's utterance, in response to the wake-up.

In operation 2105, the processor 480 may process a task of a first domain on the basis of first voice information based on user's utterance. According to an embodiment, the processor 480 may recognize the first voice information based on the user's utterance after the wake-up, and may process at least one task related to execution of a function of a domain corresponding to the first voice information. For example, upon recognizing "Music increase" based on the user's utterance, the processor 480 may increase a volume value of music according to a set value.

In operation 2107, the processor 480 may check whether a timeout occurs after processing the task. According to various embodiments, the processor 480 may start an activation wait time in sequence or in parallel with task processing. In various embodiments, the activation wait time may include a time in which a voice recognition service (e.g., a follow-up command processing mode, a voice interface) for recognition of a follow-up command is maintained after the wake-up, or after a task is performed following the wake-up. The processor 480 may determine whether a timeout occurs in response to the count of the activation wait time. For example, the processor 480 may determine whether a time (e.g., 10 seconds, 1 minute, 5 minutes, etc.) which is set to the activation wait time elapses.

Upon determining that the timeout occurs in operation 2107 (i.e., Yes in operation 2107), the processor 480 may deactivate a voice recognition service in operation 2109. According to an embodiment, the electronic device 400 may maintain the active state of the first processor, and may deactivate the second processor.

In operation 2111, the processor 480 may wait for the wake-up word detection.

Upon determining that the timeout does not occur in operation 2107 (i.e., No in operation 2107), the processor 480 may determine whether second voice information is detected in operation 2113.

Upon determining that the second voice information is not detected in operation 2113 (i.e., No in operation 2113), proceeding to operation 2107, the processor 480 may perform operation 2107 and its subsequent operations.

Upon determining that the second voice information is detected in operation 2113 (i.e., Yes in operation 2113), the processor 480 may determine whether the second voice information is the wake-up word in operation 2115. According to an embodiment, if the second voice information is the wake-up word, the processor 480 may detect the wake-up word based on the second voice information on the basis of the first processor.

Upon determining that it is the wake-up word in operation 2115 (i.e., Yes in operation 2115), the processor 480 may end an operation of processing a follow-up command of a task based on the first voice information in operation 2117. According to an embodiment, the processor 480 may delete an audio file or the like recorded to compare a previous conversational context and an additional conversational context based on the follow-up command, and may process an operation related to execution of a new task. According to an embodiment, the processor 480 may process the task executed based on the first voice information in background, and may end the task according to a task type.

In operation 2119, the processor 480 may process the execution of a corresponding operation. According to an embodiment, the processor 480 may transition to a follow-up command processing mode based on a new task, and may process a related task according to a command which is input together with the second voice information in the follow-up command processing mode or a command which is input separately from the second voice information. According to an embodiment, the processor 480 may re-start an operation (e.g., an activation wait time setup and/or count) related to the voice recognition service in response to the wake-up based on the second voice information.

Upon determining that it is not the wake-up in operation 2115 (i.e., No in operation 2115), for example, upon determining that it is a follow-up command which is input during the voice recognition service, the processor 480 may determine whether the second voice information corresponds to a follow-up command of the first domain in operation 2121.

Upon determining that the second voice information is the follow-up command of the first domain in operation 2121 (i.e., Yes in operation 2121), the processor 480 may process a task of the first domain on the basis of the second voice information in operation 2123. According to an embodiment, the processor 480 may process a task based on a functional unit or a domain unit as described above.

Upon determining that the second voice information is not the follow-up command of the first domain in operation 2121 (i.e., No in operation 2121), for example, upon determining that the second voice information is a follow-up command of the second domain, the processor 480 may process the task of the second domain on the basis of the second voice information in operation 2125. According to an embodiment, the processor 480 may process a task based on transition between domains.

As described above, a method of operating an electronic device according to various embodiments may include detecting a wake-up word in an inactive state of a voice recognition service, waking up based on the detection of the wake-up word, processing a first task corresponding to a first voice command of a user on the basis of the wake-up, setting a wait time during which a follow-up command can be received based on the processing of the first task, detecting a second voice command of the user during the wait time, analyzing a conversational context on the basis of the first voice command and second voice command, and processing a second task on the basis of a result of the analysis.

According to various embodiments, the waking up may include transitioning from the inactive state of the voice recognition service to an active state, and maintaining the active state of the voice recognition service during the wait time, and extending the wait time in response to voice command reception during the wait time.

According to various embodiments, the second voice command may be a command in which the wake-up word and a redundant command are omitted.

According to various embodiments, the detecting of the second voice command may include entering a follow-up command processing mode for detecting a voice command in which a trigger for the wake-up is omitted during the wait time upon processing the first task on the basis of the first voice command, and recognizing the second voice command in which the wake-up word and a redundant command are not included in the follow-up command processing mode.

According to various embodiments, the setting of the wait time may include setting the wait time to a pre-set wait time or changing the wait time to a time value different from the wait time.

According to various embodiments, the setting of the wait time may include determining the changed time value of the wait time on the basis of context cognition.

According to various embodiments, the analyzing of the conversational context may include comparing the conversational context on the basis of voice commands which are input during the wait time, and determining an association of a previous conversational context and an additional conversational context on the basis of a result of the comparison.

According to various embodiments, the processing of the second task may include processing the second task based on a functional unit, a domain unit, or domain switching on the basis of the result of the comparison.

According to various embodiments, the method may further include providing a feedback indicating that an input of a follow-up command can be input without the wake-up word, on the basis of at least one output scheme, during the wait time.

According to various embodiments, the waking up may include activating a voice user interface on the basis of the wake-up, and operating the voice user interface in background during the wait time in response to execution of the task based on the first voice command.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

The invention claimed is:

1. An electronic device comprising:
   a microphone;
   a memory, wherein the memory stores a domain list including a plurality of domains, a plurality of functions and a plurality of pre-set wait time, each of the plurality of pre-set wait time corresponding to each of the plurality of domains;
a light emitting diode (LED); and
at least one processor operatively coupled to the microphone, the memory, and the LED, wherein the at least one processor is configured to:
  detect a wake-up word of a user in an inactive state of a voice recognition service;
  activate the voice recognition service in response to detecting the wake-up word;
  detect a first voice command corresponding to a first domain in the domain list, in an active state of the voice recognition service;
  process a first task based on the detected first voice command;
  set a wait time for receiving a second voice command based on a score and a pre-set wait time, wherein the score is calculated based on a context cognition of the first task and the pre-set wait time corresponds to the first domain among the plurality of pre-set wait time;
  turn on the LED during the wait time;
  detect the second voice command of the user during the wait time;
  in response to detecting the second voice command during the wait time, determine whether the first voice command and the second voice command correspond to a same function in the first domain on the domain list;
  in response to determining that the first voice command and the second voice command correspond to the same function in the first domain, process a second task based on the first voice command, the second voice command and the function corresponding to the first voice command and the second voice command in the first domain;
  in response to determining that the first voice command and the second voice command correspond to the same function in the first domain and the second voice command includes a first item related to the function corresponding to the first voice command and the second voice command in the first domain and a second item which is not related to the function corresponding to the first voice command and the second voice command in the first domain, provide a feedback to confirm whether the second voice command is a command intended by the user;
  in response to determining that the second voice command corresponds to a different function in the first domain, process a third task based on the second voice command and the function corresponding to the second voice command in the first domain; and
  in response to determining that the second voice command corresponds to a second domain different from the first domain, process a fourth task based on the second voice command and the second domain corresponding to the second voice command.

2. The electronic device of claim 1, wherein the at least one processor comprises:
  a first processor which recognizes the wake-up word; and
  a second processor which wakes up on a basis of detection of the wake-up word of the first processor and processes voice recognition and an operation related to the voice recognition service.

3. The electronic device of claim 1, wherein the second voice command is a command in which the wake-up word and a redundant command are omitted.

4. The electronic device of claim 1, wherein the at least one processor is further configured to:
  in response to not detecting the second voice command during the wait time, deactivate the voice recognition service, and
  remove data which is input until an end of the wait time.

5. The electronic device of claim 1, wherein the at least one processor is further configured to:
  compare a second conversational context of the second voice command which is input during the wait time, with a first conversational context of the first voice command; and
  determine an association of the first conversational context and the second conversational context on a basis of a result of the comparison.

6. The electronic device of claim 1, wherein the at least one processor is further configured to:
  provide a feedback indicating that an input of the second voice command can be input without the wake-up word, on a basis of at least one output scheme, during the wait time.

7. The electronic device of claim 1, wherein the at least one processor is further configured to:
  activate a voice user interface on a basis of the activation of the voice recognition service; and
  operate the voice user interface in background during the wait time in response to processing of the first task based on the first voice command.

8. A method of operating an electronic device, the method comprising:
  detecting a wake-up word, of a user, in an inactive state of a voice recognition service;
  activating the voice recognition service in response to detecting the wake-up word;
  detecting a first voice command corresponding to a first domain in a domain list, in an active state of the voice recognition service, wherein the domain list is stored in a memory of the electronic device and includes a plurality of domains, a plurality of functions and a plurality of pre-set wait time, each of the plurality of pre-set wait time corresponding to each of the plurality of domains;
  processing a first task based on the detected first voice command;
  setting a wait time for receiving a second voice command based on a score and a pre-set wait time, wherein the score is calculated based on a context cognition of the first task and the pre-set wait time corresponds to the first domain among the plurality of pre-set wait time;
  turning on a light emitting diode (LED) of the electronic device during the wait time;
  detecting the second voice command of the user during the wait time;
  in response to detecting the second voice command during the wait time, determining whether the first voice command and the second voice command correspond to a same function in the first domain on the domain list;
  in response to determining that the first voice command and the second voice command correspond to the same function in the first domain, processing a second task based on the first voice command, the second voice command and the function corresponding to the first voice command and the second voice command in the first domain;

in response to determining that the first voice command and the second voice command correspond to the same function in the first domain and the second voice command includes a first item related to the function corresponding to the first voice command and the second voice command in the first domain and a second item which is not related to the function corresponding to the first voice command and the second voice command in the first domain, providing a feedback to confirm whether the second voice command is a command intended by the user;

in response to determining that the second voice command corresponds to a different function in the first domain, process a third task based on the second voice command and the function corresponding to the second voice command in the first domain; and in response to determining that the second voice command corresponds to a second domain different from the first domain, processing a fourth task based on the second voice command and the second domain corresponding to the second voice command.

9. The method of claim 8, wherein the activating of the voice recognition service comprises:

transitioning from the inactive state of the voice recognition service to the active state; and maintaining the active state of the voice recognition service during the wait time, and extending the wait time in response to reception of a voice command during the wait time.

10. The method of claim 8, wherein the second voice command is a command in which the wake-up word and a redundant command are omitted.

11. The method of claim 8, wherein the method further comprises:

in response to not detecting the second voice command during the wait time, deactivating the voice recognition service, and removing data which is input until an end of the wait time.

12. The method of claim 8, wherein the determining of whether the first voice command and the second voice command correspond to the same function in the first domain comprises:

comparing a second conversational context of the second voice command which is input during the wait time with a first conversational context of the first voice command; and determining an association of the first conversational context and the second conversational context on a basis of a result of the comparison.

13. The method of claim 8, further comprising providing a feedback indicating that an input of the second voice command can be input without the wake-up word, on a basis of at least one output scheme, during the wait time.

14. The method of claim 8, wherein the activating of the voice recognition service comprises:

activating a voice user interface on a basis of the activation of the voice recognition service; and operating the voice user interface in background during the wait time in response to processing of the first task based on the first voice command.

* * * * *